(12) United States Patent
Knopp et al.

(10) Patent No.: US 7,082,858 B2
(45) Date of Patent: Aug. 1, 2006

(54) HYDRAULIC TORQUE WRENCH SYSTEM

(76) Inventors: Brian Knopp, 350 Castleview Dr., Huntington, PA (US) 15089; Harry J. Knopp, Sr., 89 Sportsman Rd., West Newton, PA (US) 15089

( * ) Notice: Subject to any disclaimer, the term of this patent is extended or adjusted under 35 U.S.C. 154(b) by 0 days.

(21) Appl. No.: 11/173,996

(22) Filed: Jul. 5, 2005

(65) Prior Publication Data

US 2006/0005668 A1   Jan. 12, 2006

Related U.S. Application Data

(62) Division of application No. 10/411,695, filed on Apr. 11, 2003, now Pat. No. 6,912,933.

(51) Int. Cl.
*B25B 13/46* (2006.01)
*B25B 17/00* (2006.01)

(52) U.S. Cl. .................. 81/57.39; 81/57.33; 81/57.44

(58) Field of Classification Search ............... 81/57.39, 81/57.33, 57.44

See application file for complete search history.

(56) References Cited

U.S. PATENT DOCUMENTS

| | | | |
|---|---|---|---|
| 2,350,404 A | 6/1944 | Liston | |
| 2,840,397 A | 6/1958 | Tollar et al. | |
| 4,382,580 A | 5/1983 | Hellander | |
| 4,698,909 A | 10/1987 | Sleigh | |
| 4,709,600 A | 12/1987 | Mierbach et al. | |
| 4,805,496 A | 2/1989 | Wagner et al. | |
| 5,003,847 A | 4/1991 | Wagner | |
| 5,103,696 A | 4/1992 | Beuke | |
| 5,311,796 A | 5/1994 | Junkers | |
| 5,479,710 A | 1/1996 | Aston | |
| 5,515,753 A | 5/1996 | Wagner et al. | |
| 5,678,293 A | 10/1997 | Sturdevant | |
| 5,768,785 A | 6/1998 | Pessin | |
| 5,875,554 A | 3/1999 | Vogelsanger | |
| 6,029,546 A | 2/2000 | Gibson et al. | |
| 6,260,444 B1 | 7/2001 | Junkers | |
| 6,802,235 B1 * | 10/2004 | Junkers et al. | 81/57.39 |
| 2002/0121161 A1 | 9/2002 | Koppenhoefer | |

FOREIGN PATENT DOCUMENTS

RU   1337549   9/1987

* cited by examiner

*Primary Examiner*—Joseph J. Hail, III
*Assistant Examiner*—Shantese McDonald
(74) *Attorney, Agent, or Firm*—Richard C. Litman

(57) ABSTRACT

A hydraulic torque wrench having a separate ratchet unit and hydraulic cylinder drive unit connectable by an overlapping cylindrical connection at selected angles of rotation providing clearance in use. The hydraulic cylinder actuates the ratchet mechanism by a connecting rod traveling through the overlapping cylindrical connection and engaging a pivotable drive plate. The ratchet may have a male drive shaft for driving a socket, or a female driver such a hex or spline wrench. The ratchet unit case may be integral, or split for removable accesses to the ratchet mechanisms. The cylinder unit hydraulic connections may be separate rotatable connections or a single connection and collar, allowing three-way rotation. Attachments for the hydraulic unit include a pipe flange spreader, a nut splitter, scissor action shears, and a lift/spreader for lifting an object from a flat surface or spreading surfaces apart. A reaction bar affixes to the drive unit body.

2 Claims, 25 Drawing Sheets

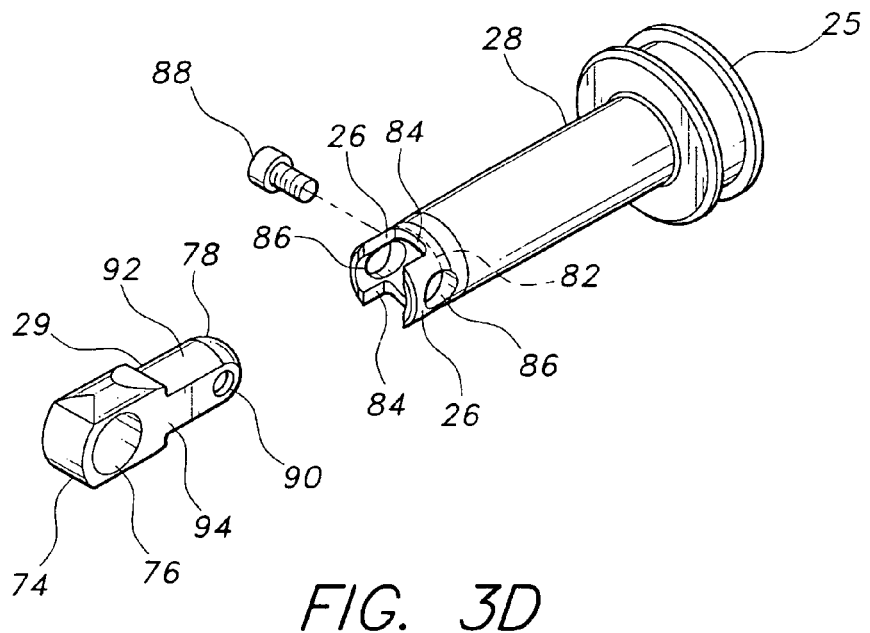
FIG. 3D
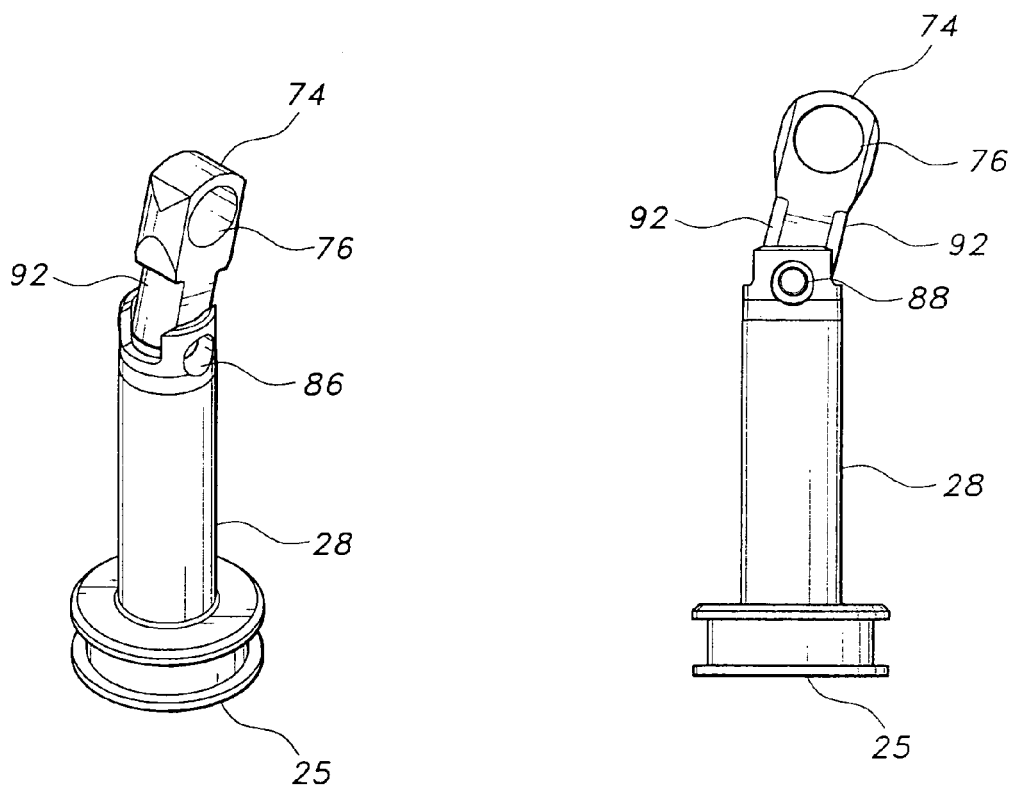
FIG. 3E
FIG. 3F

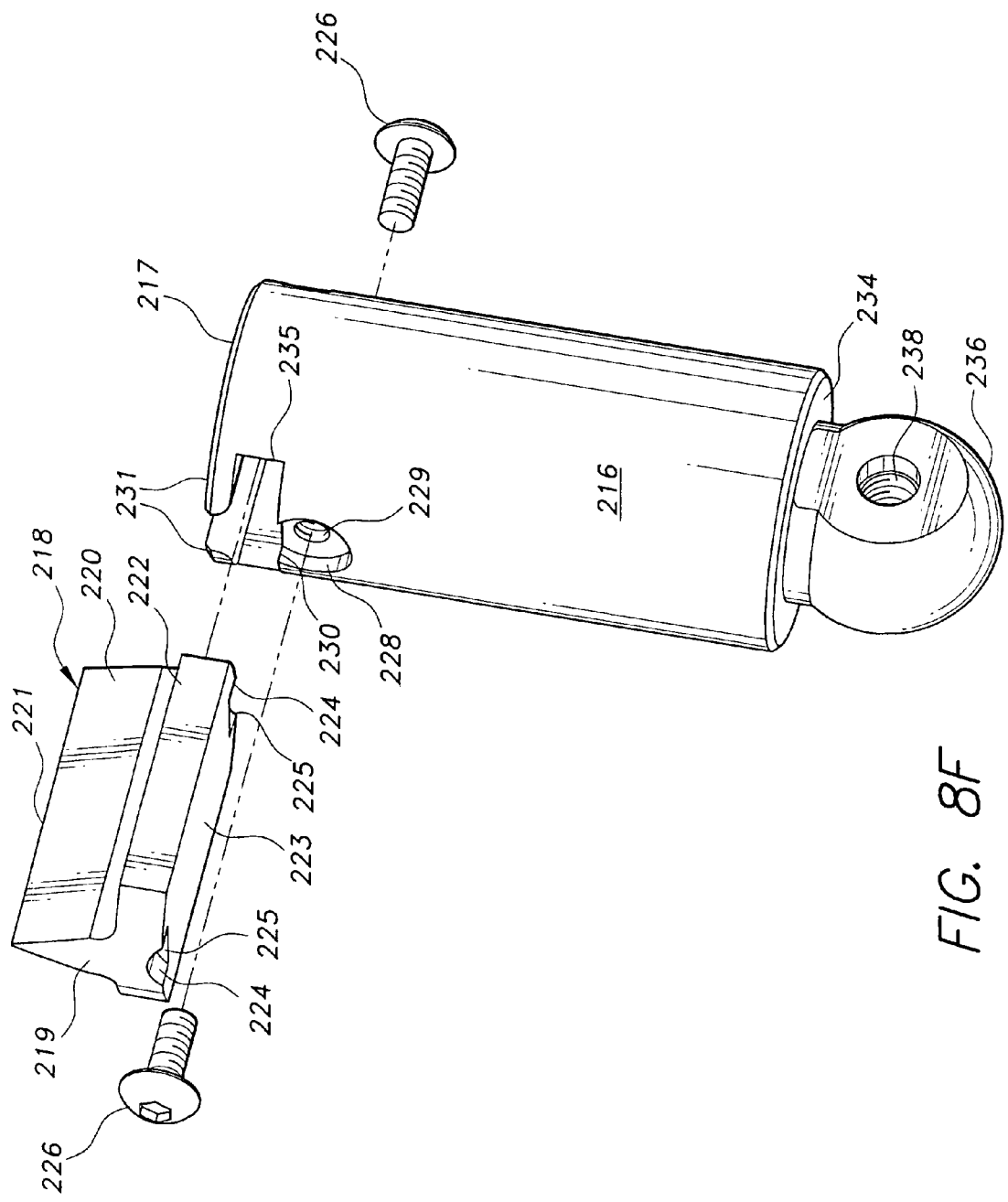

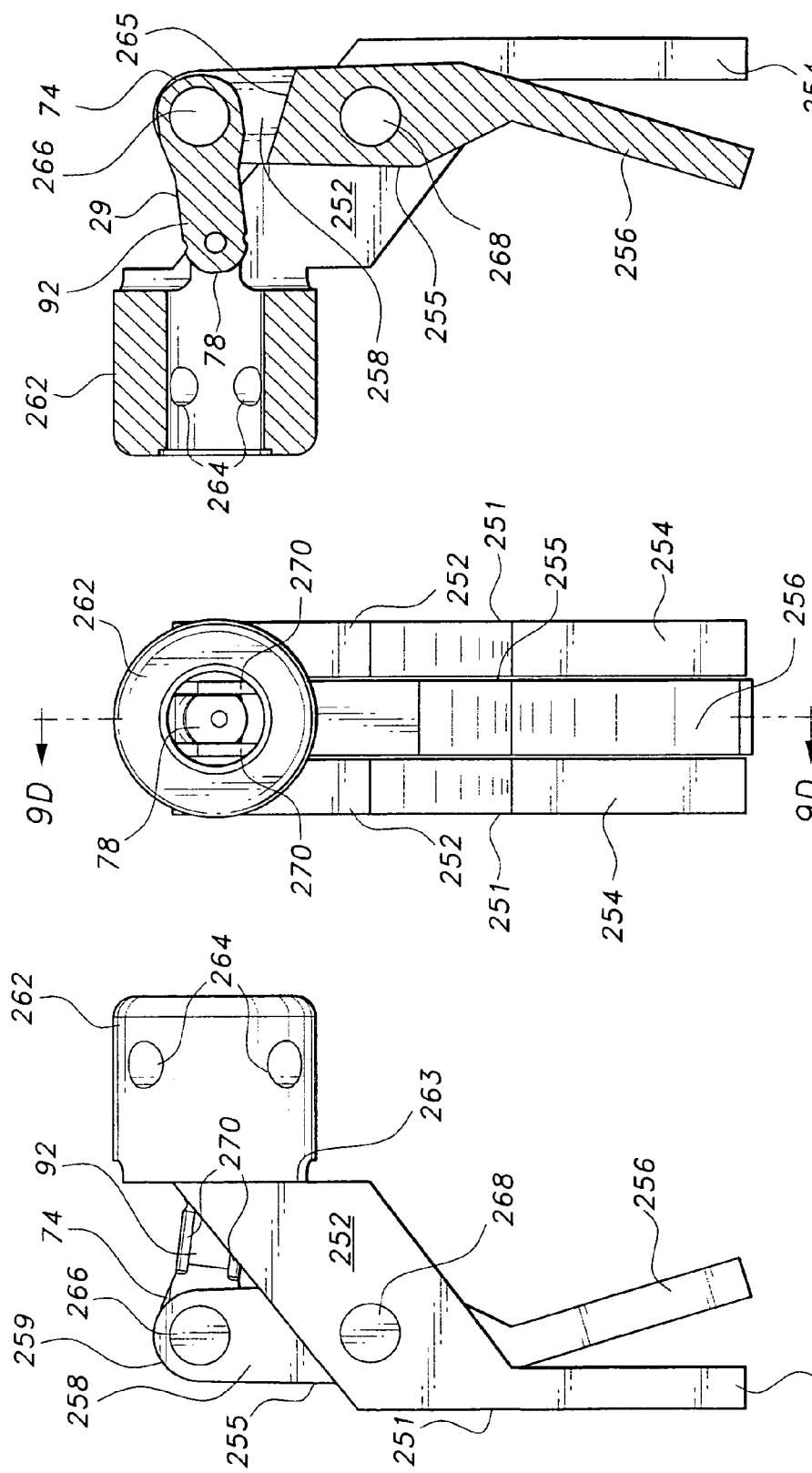

HYDRAULIC TORQUE WRENCH SYSTEM

CROSS-REFERENCE TO RELATED APPLICATION

This application is a division of application Ser. No. 10/411,695 filed Apr. 11, 2003, now U.S. Pat. No. 6,912,933.

BACKGROUND OF THE INVENTION

1. Field of the Invention

The present invention relates to power tools. More particularly, the present invention relates to a hydraulic cylinder actuated tool system having a single hydraulic cylinder actuator and replaceable tools including torque wrenches, shears, nut breakers, and flange spreaders.

2. Description of the Related Art

The use of hydraulically operated torque wrenches is well known, particularly in the tightening large nuts on bolts or studs and in tight clearance installations not allowing for the travel of a long wrench handle. Present hydraulically operated torque wrenches are not rotatably adjustable relative to the hydraulic driving cylinder, and are thus restrained from rotation by the hydraulic hoses and other appendages. It would be desirable to provide a hydraulically operated torque wrench that is rotatable relative to the actuating hydraulic driving cylinder and hose. It would further be desirable to provide a system wherein the torque wrench is removable from the hydraulic driving cylinder and other torque wrenches having different drives or sizes as well as other tools such as shears, nut breakers, and flange spreaders may be attached for driving by the same hydraulic cylinder.

U.S. Pat. No. 2,840,397, issued Jun. 24, 1958, to Tollar et al., describes a positioning device for radially-spaced sleeves using circumferentially-spaced corresponding pins.

U.S. Pat. No. 4,805,496, issued Feb. 21, 1989, to Wagner et al., describes a hydraulic wrench intended to interlock with a hydraulic cylinder.

U.S. Pat. No. 4,709,600, issued Dec. 1, 1987, to Mierbach et al., describes a power screwdriver with ratchet having attachments.

U.S. Pat. No. 5,515,753, issued May 14, 1996, to Wagner et al. describes a hydraulic power wrench having a combination piston rod having a spherical head for engaging a drive plate for driving a ratchet.

U.S. Pat. No. 5,875,554, issued Mar. 2, 1999, to Vobelsanger, describes a hydraulic powered cutter or shears.

Russian Patent No. SU 1 337 549 A1, published Sep. 15, 1987, describes a universal connector joint mechanism for operation with a hydraulic cylinder and power tool.

U.S. Pat. No. 2,350,404, issued Jun. 6, 1944 to Liston, describes a pipe flange separator.

U.S. Pat. No. 5,479,710, issued Jan. 2, 1996, to Asten, describes a hydraulic nut splitter with a splitting wedge.

U.S. Pat. No. 6,029,546, issued Feb. 29, 2000, to Sleigh describes a reaction member system for rotary fluid-operated wrenches.

U.S. Pat. No. 4,382,580, issued May 10, 1983, to Hellander, describes a lifting and shifting apparatus having a cylinder powered lift wedge.

U.S. Pat. No. 5,768,785, issued Jun. 23, 1998, to Pessin, describes as a wedge spreader tool.

U.S. Pat. No. 5,678,293, issued Oct. 21, 1977, to Sturdevant, describes a hydraulically operated spreader and lifting tool.

None of the above inventions and patents, taken either singularly or in combination, is seen to describe the instant invention as claimed. Thus a hydraulic torque wrench system solving the aforementioned problems is desired.

SUMMARY OF THE INVENTION

The present invention is a hydraulic torque wrench system having a separate ratchet unit and hydraulic cylinder drive unit which are connectable by a overlapping cylindrical chuck-like connection at selected angles of rotation so as to provide flexibility in clearance for use and to avoid twisting of hydraulic tubing. The hydraulic cylinder actuates the ratchet mechanism by means of a connecting rod traveling through the overlapping cylindrical connection and engaging a pivotable drive plate. The ratchet may have a male drive shaft for driving or connection with a socket, or a female driver such a hex or spline wrench. The ratchet unit case may be integral with an access cover plate, or split for removable accesses to the ratchet mechanisms. The hydraulic connections to the cylinder unit housing may be separate rotatable connections or a single connection and collar with rotatable hydraulic fittings allowing three-way rotation. Separate attachments are provided for use with the hydraulic unit, taking the place of the ratchet unit. These attachments include a flange spreader for separating pipe flanges, a nut splitter, scissor action shears, and a lift/spreader for lifting a corner of an object from a flat surface or spreading surfaces apart. A reaction bar is provided which may be affixed around the hydraulic cylinder unit housing which extends downward to bear against a pipe flange circumferential surface when torqueing a nut with the inventive hydraulic torque wrench. A similar reaction boot fits around the housing and against an adjacent flange nut.

Accordingly, it is a principal object of the invention to provide a hydraulic torque wrench that is adjustable to allow ease of use in restricted clearance areas.

It is another object of the invention to provide a hydraulic torque wrench having a hydraulic cylinder drive unit having a housing that is mountable at selected angles of rotation relative to the housing of a ratchet unit driven thereby.

It is a further object of the invention to provide a flange spreader attachment having a connector for use with the hydraulic torque drive unit of the present invention.

Still another object of the invention is to provide a spreader and lift attachment having a connector for use with the hydraulic torque drive unit of the present invention.

Yet another object of the invention is to provide a nut cracker attachment having a connector for use with the hydraulic torque drive unit of the present invention.

Still another object of the invention is to provide a power shears attachment having a connector for use with the hydraulic torque drive unit of the present invention.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3D is an exploded view of another embodiment of a piston and connecting rod of the hydraulic cylinder assembly of FIG. 1.

FIG. 3E is a perspective view of the piston and connecting rod of FIG. 3D.

FIG. 3F is a side elevation view of the piston and connecting rod of FIG. 3F.

FIG. 8F is an exploded view of the wedge rod and replaceable cutter head of FIG. 1.

FIG. 9B is a side elevation view of the shears attachment of FIG. 9A.

FIG. 9C is a front elevation view of the shears attachment of FIG. 9A.

FIG. 9D is a section view taken along the line 9D—9D of FIG. 9C.

Similar reference characters denote corresponding features consistently throughout the attached drawings.

DETAILED DESCRIPTION OF THE PREFERRED EMBODIMENTS

The present invention is a hydraulic torque wrench system having a separate ratchet unit and hydraulic cylinder drive unit which are connectable by an overlapping cylindrical chuck-like connection at selected angles of rotation so as to provide flexibility in clearance for use and to avoid twisting of hydraulic tubing. The hydraulic cylinder actuates the ratchet mechanism by means of a connecting rod traveling through the overlapping cylindrical connection and engaging a pivotable drive plate. The ratchet may have a male drive shaft for driving or connection with a socket, or a female driver such a hex or spline wrench. The ratchet unit case may be integral with an access cover plate, or split for removable accesses to the ratchet mechanisms. The hydraulic connections to the cylinder unit housing may be separate rotatable connections or a single connection and collar with rotatable hydraulic fittings allowing three-way rotation. Separate attachments are provided for use with the hydraulic unit, taking the place of the ratchet unit. These attachments include a flange spreader for separating pipe flanges, a nut splitter, scissor action shears, and a lift/spreader for lifting a corner of an object from a flat surface or spreading surfaces apart. A reaction bar is provided which may be affixed around the hydraulic cylinder unit housing which extends downward to bear against a pipe flange circumferential surface when torqueing a nut with the inventive hydraulic torque wrench. A similar reaction boot fits around the housing and against an adjacent flange nut.

Figure 1:
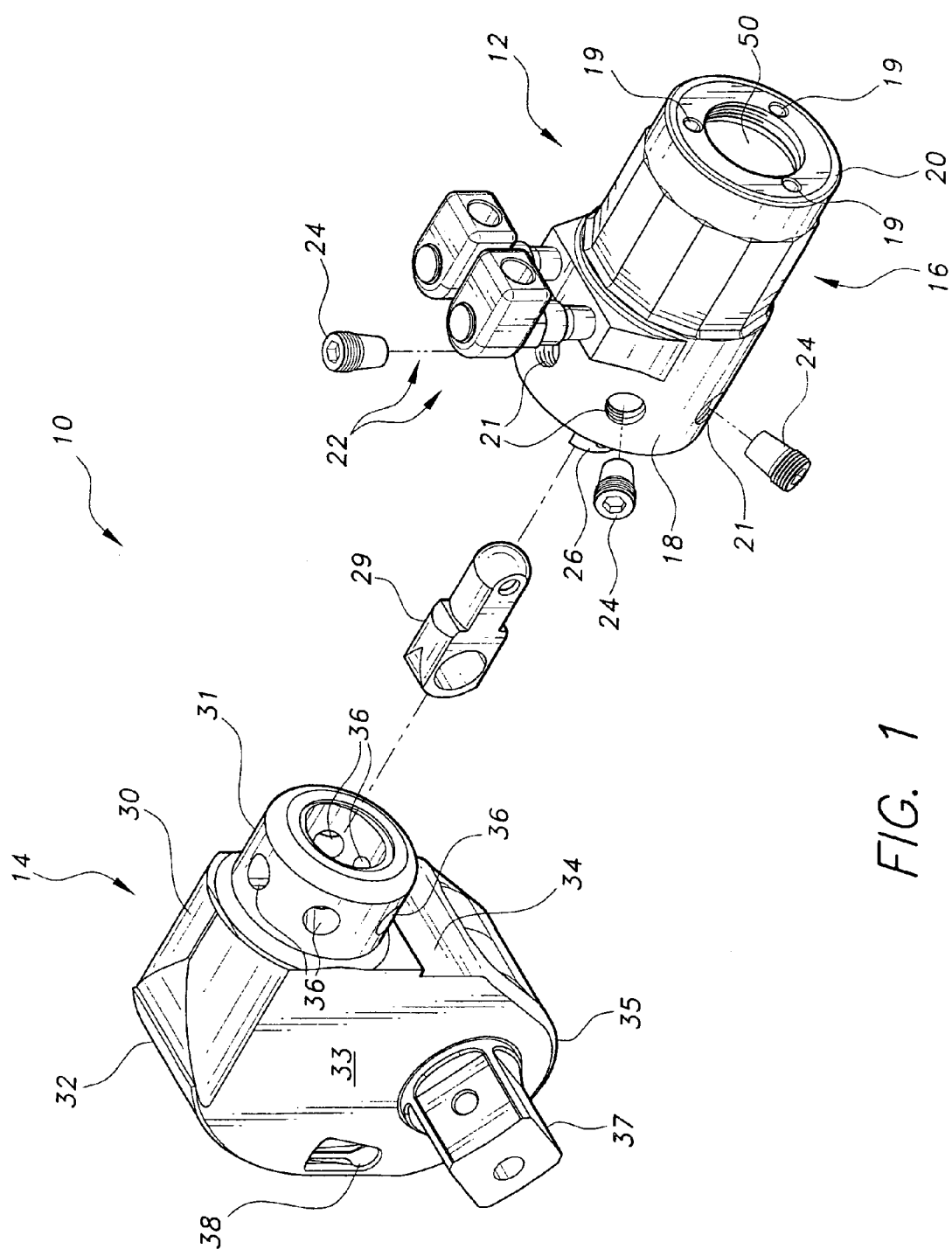
FIG. 1 is an exploded, perspective view of a hydraulic torque wrench according to the present invention.

Referring to FIGS. 1 to 6B, the inventive torque wrench ratchet and hydraulic cylinder drive unit system is generally referred to by reference number 10. As seen in FIG. 1, there is shown an exploded view of the hydraulic cylinder unit 12, the ratchet unit 14 and the connecting rod 29. Although shown in the standard alignment, the ratchet unit 14 may be attached, according to the invention, at a selected rotational angle relative to the hydraulic cylinder unit 12 to accommodate operation of the ratchet unit in a confined working area without requiring the hydraulic cylinder unit 12 to be rotated from a desired position, thus avoiding twisting and wrapping of hydraulic hoses (not shown) connected to the fittings 22 during use. Hydraulic cylinder unit 12 includes a generally cylindrical body 16 having a female cylindrical boss 18 at a connection end and having a free end portion having a free end 20. Female cylindrical boss 18 has a plurality of radially directed, circumferentially spaced, threaded through-bores 21 along a plane perpendicular to the longitudinal axis of the hydraulic cylinder (see FIG. 2A) of hydraulic cylinder unit 12 and spaced about equidistant between a bushed end wall 46 and the forward edge of the boss 18. Hydraulic fittings 22 are attached to body 16 for receiving high-pressure hydraulic hoses (not shown) for delivering and removing pressurized hydraulic fluid for operating the hydraulic cylinder unit 12. Piston rod 28(see FIG. 2A) has piston rod connector 26 on its forward end for connection and engagement with connecting rod 29. Piston rod 28 may be rotated as desired so as to align with connecting rod 29 when connecting hydraulic drive unit 12 with ratchet 14 at a selected angle.

Ratchet unit 14 has a housing 30 having a generally oval shaped periphery and having a male connector cylindrical boss 31 extending laterally from the housing upper portion, a housing top cover plate 32 extending between opposing planar housing sidewalls 33, a back plate 34 located between sidewalls 33 below cylindrical boss 31, and a lower base portion 35. Ratchet unit 14 has a drive shaft 37 extending at its lower portion from a rotatable ratchet mechanism (see FIG. 5). Male connector cylindrical boss 31 has an outer diameter such as to slidingly fit coaxially within hydraulic unit female cylindrical boss 18 and has a plurality of radially directed, circumferentially spaced, inwardly tapered attachment bores 36 spaced from the boss front lip so as to operatively attach with said hydraulic drive unit 16. Attachment bores 21 and 36 are of such size as to receive tapered end threaded bolts 24. Upon assembly, the male boss 31 is coaxially inserted into female cylindrical boss 36 and rotated to the desired selected angle with bores 36 aligned with bores 21 in female cylindrical boss 18, and the bolts 24 inserted in the aligned bores to the point of the threaded portion reaching the threaded bore 21, wherein a driver is placed in a slot in the ends of the threaded portion and turned until the bolts are tight, thus securing the male boss and cylindrical boss together at a desired angle for operation of the hydraulic drive and ratchet within the respective body and housing.

Pawl control levers 38 extend from recesses in front and rear sidewalls 33, respectively, for controlling rotation of the rotatable ratchet mechanism. A female drive such as a box hex drive may be substituted for the drive shaft 37 as desired. Any male or female drive configuration may be fitted as desired such as square, hex, and spline configurations.

Referring more particularly to FIGS. 2A–2D, there are shown side elevation, plan, sectional, and perspective views, respectively of a first embodiment of the hydraulic drive piston unit 12. Hydraulic cylinder unit 12 has a generally cylindrical housing 16 having a polygonal outer wall 44 and defining a coaxial hydraulic cylinder within. Cylindrical housing 16 has a hydraulic fitting boss 42 extending from the upper portion above end wall 46 and accepts hydraulic swivel fittings 40 forming the lower portion of hydraulic fittings 22, hydraulic connectors 39 providing for connection with respective hydraulic pressure hoses (not shown).

Cylinder end wall 46 and threaded end cap 50 define the front and rear ends, respectively, of the hydraulic cylinder, and piston 25 drives the connected piston rod 28 forward through the centrally mounted bushing 47 of end wall 46 when hydraulic fluid is injected into hydraulic pressure chamber 49. Piston rod seal 27 is located to the rear of adjacent bushing 47 to seal against hydraulic fluid leaking through the piston rod 28 at the cylinder end wall 46.

End cap 50 acts as an end wall of hydraulic pressure chamber 49 and has a rear axial recess acting as a threaded retainer cap receiver 54. Threaded retainer cap receiver 54 is cylindrical in shape, having internal threads and external threads thereon. The free end portion of cylindrical body 16 in internally threaded for receiving the external threads of threaded retainer cap receiver 54. End cap seal 52 ensures a seal between the machined end of the hydraulic pressure chamber 49 and the threaded end cap accessory receiver 54 when end cap 50 is inserted at free end 20 and screwed inward within the free end portion until tight against end cap seal 52. A three-pronged spanner wrench acting on the three spaced drive bores 19 in the rear surface of end cap 50 may be used in tightening end cap 50 (also see FIG. 1). Retainer cap 55 is secured to end cap 50 by means of a cylindrically shaped, axially located retainer cap threaded boss 56 which screws into interior threaded surface of retainer cap receiver 54 within the recess of end cap 50. An annulus is formed between the threaded boss 56 and the outer portion of the retainer cap 55 allowing retainer cap 55 to extend over free end 50 and the free end portion of cylindrical body 16 to the polygon unit cylinder wall portion 44 when screwed into threaded end cap accessory receiver 54 for securing a reaction attachment over wall portion 44 (See FIG. 11B).

Figure 2C:
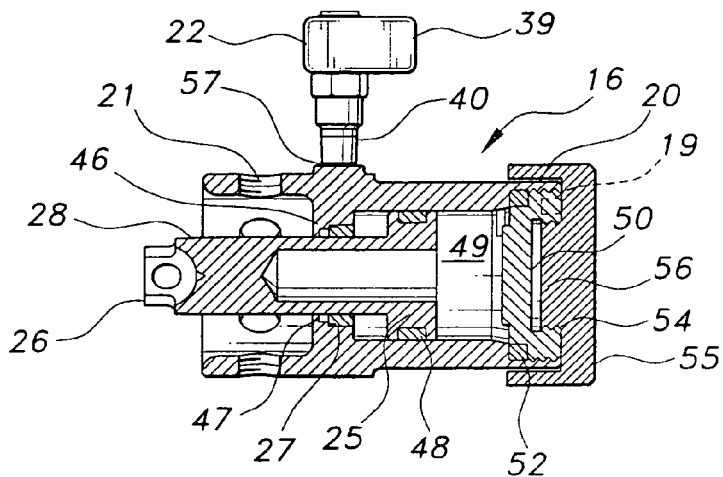
FIG. 2C is a sectional view taken along the line 2C—2C of FIG. 2B.
Figure 2B:
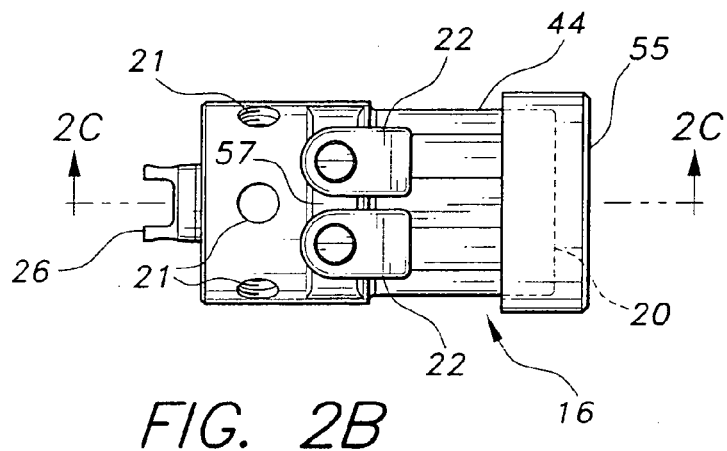
FIG. 2B is a plan view of the hydraulic cylinder assembly of FIG. 1.
Figure 2A:
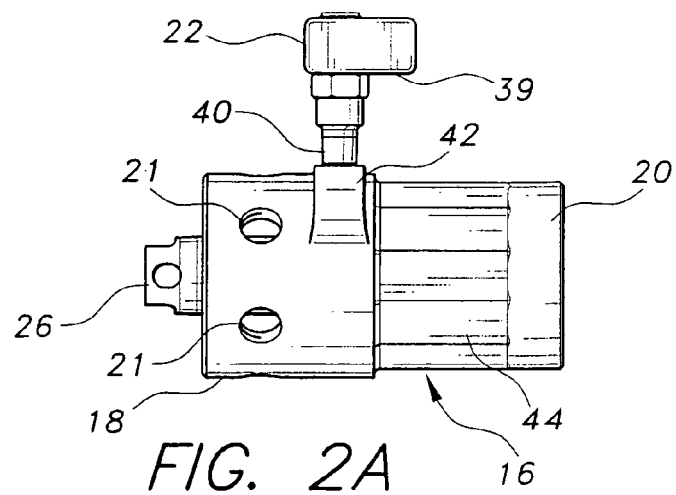
FIG. 2A is a side elevation view of the hydraulic cylinder assembly of FIG. 1.
Figure 2D:
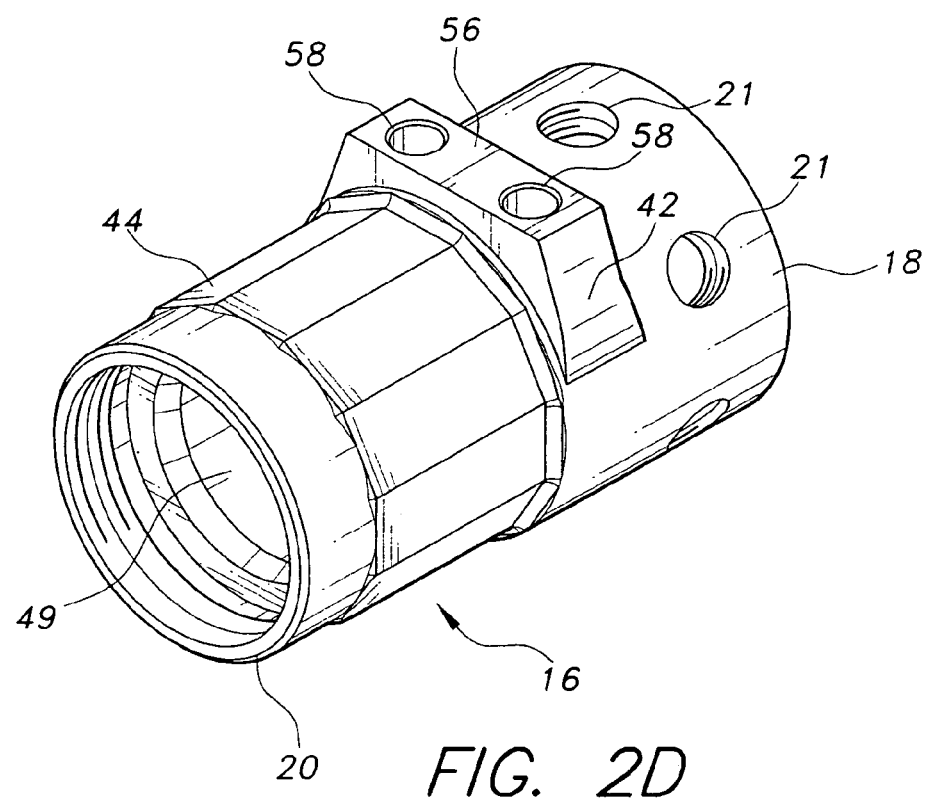
FIG. 2D is a perspective view of the housing of the hydraulic cylinder assembly of FIG. 1.

As seen in FIG. 2D, hydraulic fitting boss 42 is generally rectangular and has a flat 56 having hydraulic swivel fitting receivers 58 for receiving two fittings 40 spaced crosswise relative to body 16 fluidly connected in a known manner with the hydraulic cylinder at front and rear sides of piston 25, one fitting leading to the hydraulic pressure chamber by means of a rearward directed bore within the body 16 and exiting under pressure proximate the end cap 50 to drive piston 25 in a forward stroke, and the other fitting leading to the cylinder volume between the piston and the end wall 46 by means of a bore for providing hydraulic fluid to force piston 25 to retract toward end cap 50. The bores also serve to release hydraulic fluid from the opposite side of the piston to allow its movement during a pressure stroke.

Figure 2E:
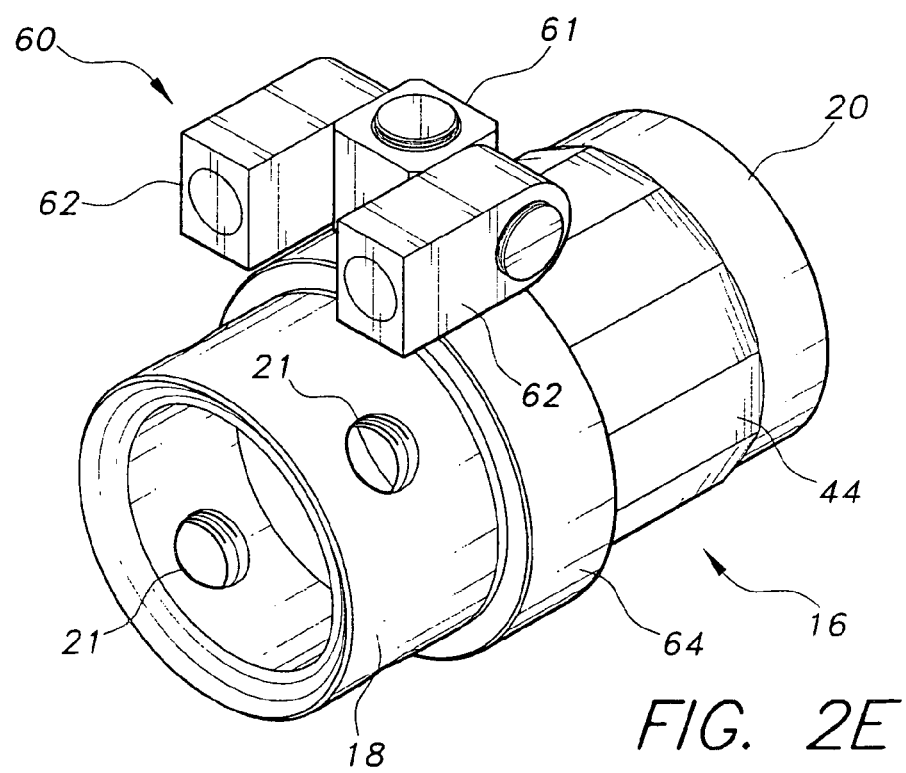
FIG. 2E is a perspective view of the housing of the hydraulic cylinder assembly of FIG. 1 having a three direction rotational hydraulic fitting and collar.
Figure 2F:
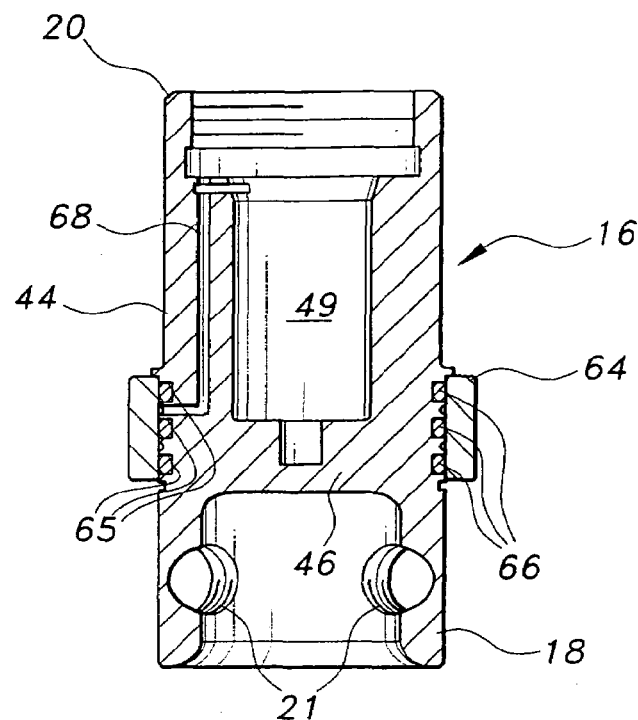
FIG. 2F is a sectional view of the housing of FIG. 2E, illustrating the piston hydraulic fluid inlet bore.
Figure 2G:
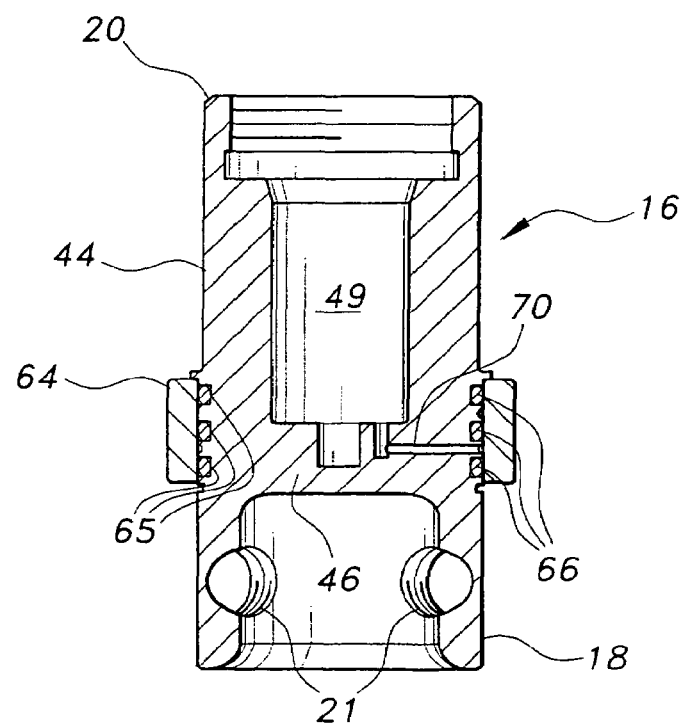
FIG. 2G is a sectional view of the housing of FIG. 2E, illustrating the piston hydraulic fluid outlet bore.

Referring more particularly to FIGS. 2E–2G, there is shown a perspective, and two sectional views offset from the vertical lengthwise center of a second embodiment of the hydraulic piston drive unit 12. In this embodiment, cylinder unit body 16 has a three-way pivot hydraulic fitting 60 having opposed hydraulic connectors 62 for connection with conventional hydraulic fluid supply hoses (not shown) and having a single upright connector 61 connected with a hydraulic collar 64 encircling body 16 at cylinder end wall 46. Three axially spaced O-ring grooves 65 are machined within the outer surface of body 16 and contain O-rings 66 separating the hydraulic cylinder unit body 16 and hydraulic collar 64 into a first and a second circumferential annular hydraulic fluid passage. The single upright connector 61 is fixedly mounted on hydraulic collar 64 and has an upper concentric swivel portion 63 connected so as to swivel in either direction coaxially with the fixed portion of upright connector 61. Hydraulic connectors 62 are each connected so that each can independently swivel in either direction along planes perpendicular to upper concentric swivel portion 63. Three axially spaced O-rings may form first and second fluid passages in the annulus between the fixed upright connector 61 and its upper swivel portion for separate fluid connection with hydraulic connectors 62, similar to the structure between hydraulic collar 64 and cylinder unit body 16. The fixed vertical fitting 61 has a parallel first and second vertical hydraulic fluid passages 67,69 within its body which fluidly communicates with the first and second fluid passages of the upper swivel connector portion 63 and the first and second circumferential annular hydraulic fluid passages in the annulus between the body 16 and the hydraulic collar 64, respectively.

Body 16 contains a hydraulic pressure chamber inlet bore 68 and a hydraulic pressure chamber exit 70 respectively providing hydraulic fluid from the first and second circumferential annular hydraulic fluid passages, thereby providing separate hydraulic fluid connection between the supply hoses (not shown) connected with hydraulic swivel connectors 62 and respective sides of piston 25 so as to operate the hydraulic drive unit 12 in a manner identical to that of the first embodiment as described above.

Figure 3A:
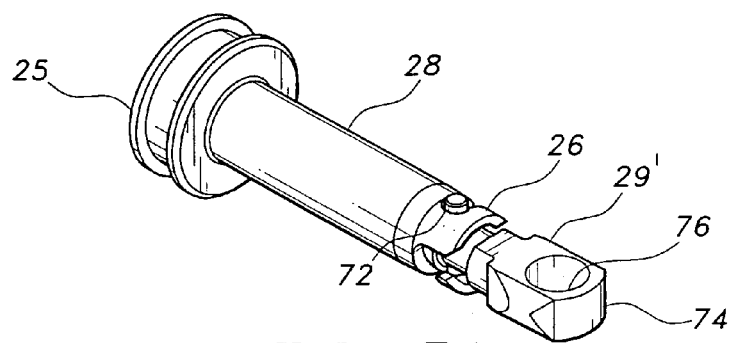
FIG. 3A is a perspective view of one embodiment of a piston and connecting rod of the hydraulic cylinder assembly of FIG. 1.
Figure 3B:
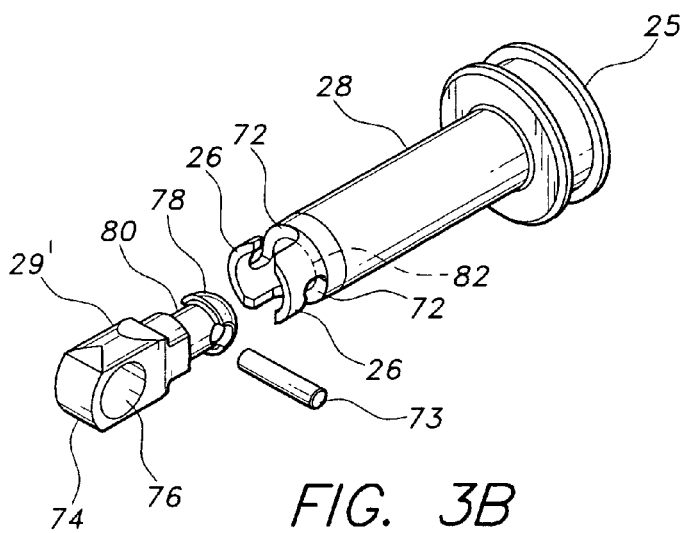
FIG. 3B is an exploded view of the piston and connecting rod embodiment of FIG. 3A.
Figure 3C:
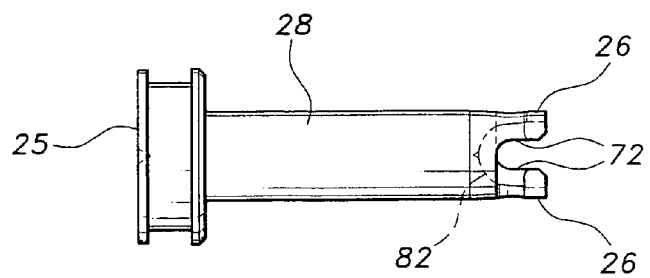
FIG. 3C is a side elevation view of the piston and piston rod of FIG. 3A.

Referring more particularly to FIGS. 3A–3C, there is shown a perspective, exploded and side elevation view, respectively, of another embodiment of the connecting rod and piston assembly of the hydraulic torque wrench of FIG. 1. Piston 25 has axially mounted rod 28 extending therefrom at a proximate end and having a split connector 26 extending axially from the periphery of the distal or actuating end thereof. Split connector 26 defines opposing "L"-shaped slots 72, each having an axially long portion extending to a distal end thereof, diametrically splitting connector 26, and a short circumferentially extending portion, each extending in the same direction of rotation. The connector is thus configured to receive a diametrically extending pin 73 axially in the axially extending long portions of the opposing grooves and then, upon rotation, lock around the pin in the short circumferentially extending portion. The distal end of the rod has a spherical bore 82 having an apex (shown in hidden lines) within the rod and having a circumferential lip to which the connector 26 is mounted, the spherical bore acting as a bearing to form the activation end.

Another embodiment of the connecting rod 29' is provided for transferring driving force between the hydraulic drive unit 12 and the ratchet unit 14. Connecting rod 29 has a crank end portion 74 having a connecting rod crank bore 76 therethrough, and a hemispheric end 78 sized to mate with the spherical bore of the piston rod activation end, thus forming a hemispheric activated end. A shaft 80 connects the crank end portion 74 and the hemispheric end 78 to form the connecting rod 29. A horizontally disposed through-bore is disposed at the connection of the hemispheric end 78 and shaft 80 to receive connector pin 73 in a press fit. Pin 73 extends radially outward from each side of connecting rod 29', thereby allowing for insertion of hemispheric end 78 into connector 26 of the piston rod distal end and locked against the hemispheric bore 82 by rotating the connecting rod 29' so as to lock the extended ends of the pin 73 into the short circumferentially extending portions of the "L"-shaped slots 72 of the connector 26. The piston 25 has a circumferential groove for placement of seal 48 (see FIG. 2C) for sealing against bypass of hydraulic fluid between the piston and the cylinder wall of the hydraulic unit body 16.

Referring more particularly to FIGS. 3D–3F, there is shown an exploded view, a perspective view, and a side elevation view, respectively, of a second embodiment of a piston and connecting rod of the hydraulic cylinder assembly of FIG. 1. Piston 25 has axially mounted rod 28 extending therefrom at a proximate and having a split connector 26 extending axially from the periphery of the distal or actuating end thereof. Split connector 26 defines diametrically opposed clearance slots 84 defining a vertical opening therethrough. The distal end of the rod has a spherical bore 82 having an apex (shown in hidden lines) within the rod and having a circumferential lip to which the connector 26 is mounted, the spherical bore acting as a bearing to form an activation end.

A connecting rod 29 (as shown in FIG. 1) is provided for transferring driving force between the hydraulic drive unit 12 and the ratchet unit 14. Connecting rod 29 has a crank end portion 74 having a connecting rod crank bore 76 therethrough and a hemispheric end 78 sized to mate with the spherical bore 82 of the piston rod activation end, thus forming a hemispheric activated end. A flatted shaft 92 connects the crank end portion 74 and the hemispheric end 78 to form the connecting rod 29. The shaft 92 has opposed vertical flats, which extend from the flat sides of the connecting rod crank end portion 74 and extends through the hemispheric end 78 so as to truncate the hemispherical shape of end 78 on opposing sides, thereof. A horizontally disposed, threaded through-bore 90 is disposed at the connection of the hemispheric end 78 and shaft 92 to receive threaded hub screw 88 in a threaded fit. The head of hub screw 88 preferably has a hex slot (not shown) for turning with a key wrench. Split connector 26 has horizontally disposed, diametrically aligned hub screw receiving bores 86 for rotatably receiving hub screw 88. Clearance slots 84 are of sufficient width and length to rotatably receive the flatted sides 94 of the actuated end of connecting rod 29 such that it bears against the hemispheric actuating end of piston rod 28, and horizontally opposed hub screw receiving bores 86 are located therein so as to align with threaded through-bore 90 to rotatably receive hub screw 88 when connecting rod actuated end is in place. This allows the piston rod actuating end and the connecting rod actuated end to transfer force while allowing rotation therebetween about the axis formed by the hub screw receiving bores 86.

Figure 4A:
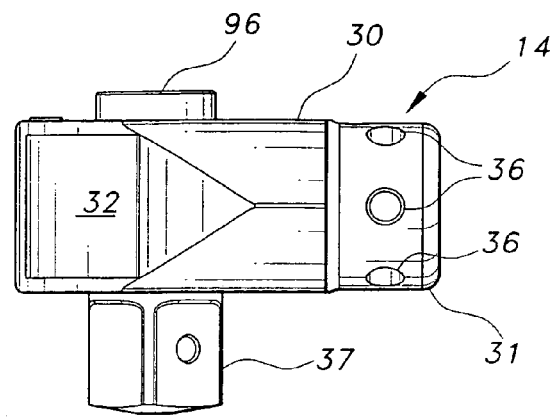
FIG. 4A is a plan view of the torque wrench assembly of FIG. 1.
Figure 4B:
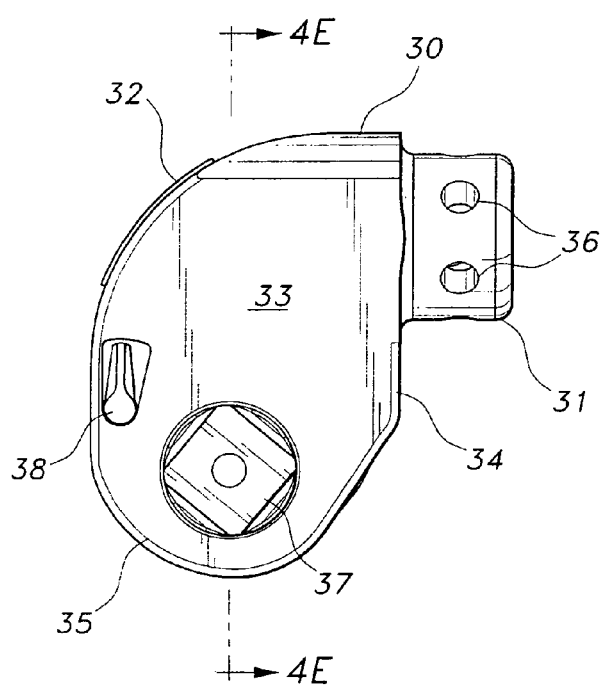
FIG. 4B is a side elevation view of the torque wrench assembly of FIG. 1.
Figure 4C:
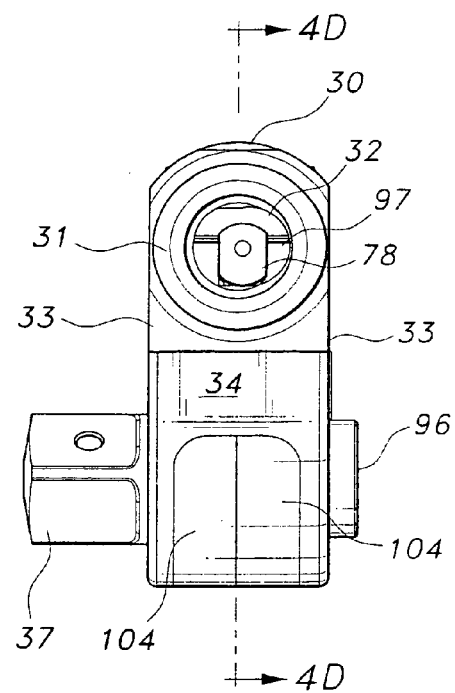
FIG. 4C is a front elevation view of the torque wrench assembly of FIG. 4B.
Figure 4D:
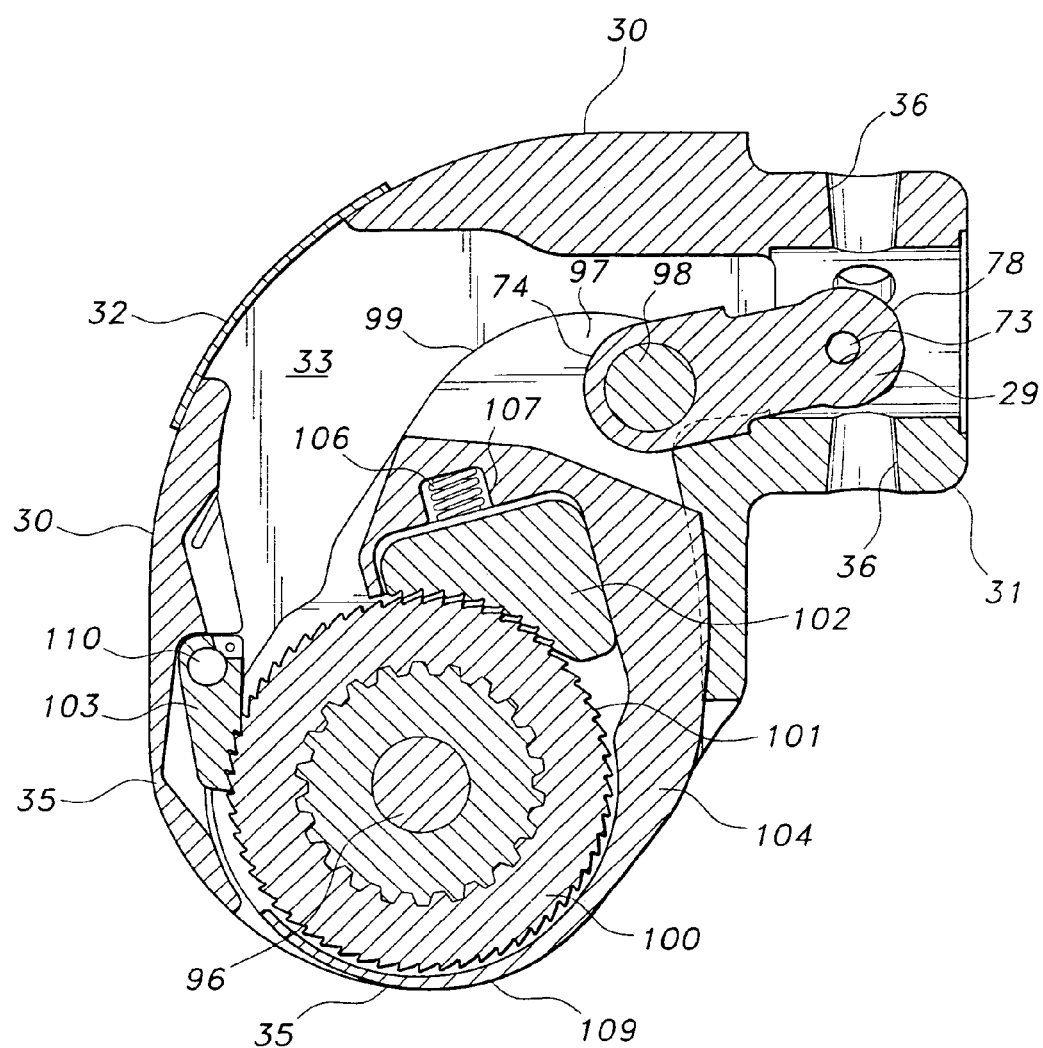
FIG. 4D is a sectional view taken along line 4D—4D of FIG. 4B.
Figure 4E:
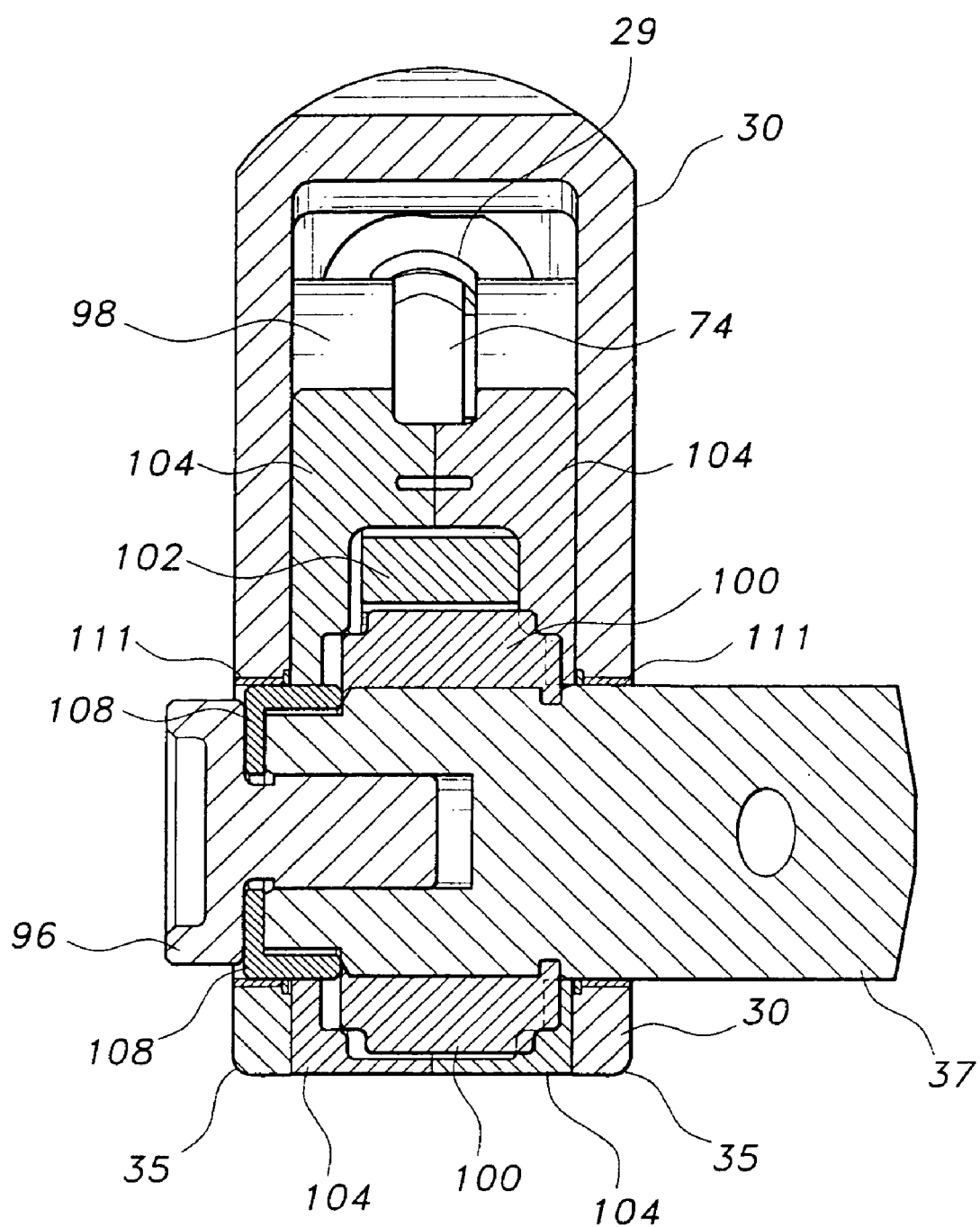
FIG. 4E is a sectional view taken along line 4E—4E of FIG. 4C.
Figure 5:
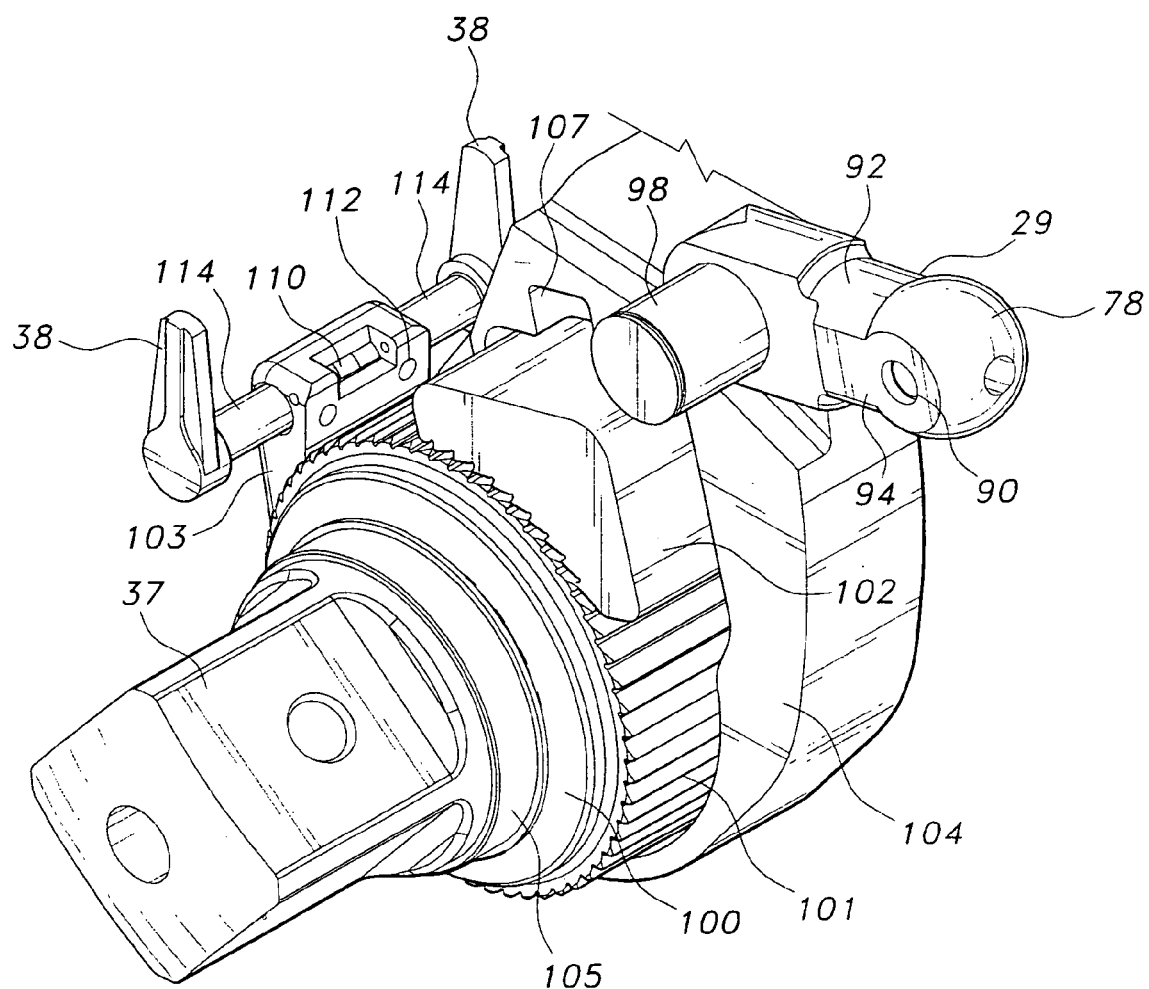
FIG. 5 is a perspective view of the ratchet mechanism and connecting rod of FIG. 1 with a driver plate broken away.

Referring more particularly to FIGS. 4A–5, there is shown a plan view, a side elevation view, a front elevation view, sectional views of the torque wrench assembly of FIG. 1 and a perspective view of the ratchet mechanism and connecting rod of the torque wrench assembly of FIG. 1, respectively. Ratchet unit 14 has an integral housing 30 having a generally oval-shaped periphery and having a male connector cylindrical boss 31 extending laterally from the housing upper portion, a removable housing top cover plate 32 extending between opposing planar housing sidewalls 33 and providing for an upper peripheral inner access area, a lower back plate 34 located between sidewalls 33 below cylindrical boss 31 and a lower base portion 35 providing a lower peripheral opening for insertion and removal of ratchet mechanism driving plates 104. Ratchet unit 14 has a drive shaft 37 extending perpendicularly outward at its lower portion from a rotatable ratchet mechanism (see FIG. 5). Male connector cylindrical boss 31 has an outer diameter such as to slidingly fit coaxially within hydraulic unit female cylindrical boss 18 (see FIG. 1) and has a plurality of radially directed, circumferentially spaced, inwardly tapered attachment bores 36 spaced from the boss front lip so as to operatively attach with said hydraulic drive unit 16. Attachment bore 36 is of such size as to receive the tapered end of a threaded bolt 24.

The ratchet mechanism includes a pair of vertically oriented driving plates 104 mounted side-by-side and having mutually inwardly stepped driven end lever portions 99 at their mutually upper end portions forming a crank pin slot 97 therebetween and having aligned crank bores for receiving crank pin 98 mounted therein, said connecting rod 29 being mounted at its crank end 74 on crank pin 98 so as to rotatably fit between lever portions 99 within slot 97. In the rest position, the remainder of connecting rod 29 extends through the inner portion of male cylindrical boss 31. Slot 97 is of such dimensions as to allow connecting rod 29 to rotate around crank pin 98 when activating driving plate lever portions 99 in a forward or rearward direction during operation of the torque wrench unit 12.

Driving plates 104 are supported for partial rotation within the lower portion of housing 30 around ratchet wheel 100 and the lower portions 109 of the drive plates 104 are exposed outside the casing 30. The upper portions of driving plates 104 define a generally triangular, downward opening area containing a similarly shaped drive pawl 102 mounted therein for limited vertical travel, the driving plates 104 mutually defining drive pawl spring indent 107 therebetween receiving drive pawl spring 106. Drive pawl spring 106 bears against the upper portion of drive pawl 102 for maintaining ratcheting spring pressure against drive pawl 102 and forcing drive pawl 102 against ratchet wheel 100. Ratchet wheel 100 has peripheral driven teeth 101 which mesh with driving teeth on the underside of drive pawl 102 such that when drive pawl 102 is driven forward by driving plates 104 driven by connecting rod 29 against crank pin driving driven end lever portions 99, ratchet wheel driven teeth 101 are driven in forward rotation. When connecting rod 29 is retracted, drive pawl spring 106 is compressed by driving pawl 102 when the driving teeth of drive pawl 102 ratchet back over the ratchet wheel driven teeth 101 to the withdrawn position.

Second spring-driven pawl 103 is rotatably attached to the inner side of the lower peripheral wall of casing 30 by means of an inward projecting boss supporting opposed lever shafts 114 leading to second pawl levers 38 and held in position against ratchet wheel 100 by rotational spring pressure relievable by rotation of levers 38 by the operator. Second pawl 103 has inner teeth, which engage ratchet teeth 101 and allow the ratchet wheel to rotate in a forward direction by spring action, but prevent back rotation unless levers 38 are turned, releasing the ratchet wheel to turn. This keeps the ratchet wheel from rotating back with the first drive pawl when it is desired to utilize multiple piston drive strokes to operate the drive shaft 37 in a single direction of rotation. The spring action is provided by a spring (not shown, attached to spring pin 110 which provides for rotation of pawl 103 against ratchet wheel 100 relative to the mounting boss.

Drive shaft 37 has an inner cylindrical bearing surface 105, which rotates relative to housing sidewall 33 with a cylindrical drive shaft bearing 111 located in the annulus therebetween. Drive shaft retainer 96 extends from housing 30 on the side opposite drive shaft 37 and maintains drive shaft 37 in a fixed axial position relative to the walls 33 by interlocking with the inner extending wall of cylindrical driveshaft cap 108 which fits over the retainer end of drive shaft 37. Another drive shaft bearing 111 is located between the cylindrical outer surface of drive shaft cap 108 and opposite housing sidewall 33, thereby securing drive shaft 37 along with ratchet wheel 100 while allowing rotation relative to sidewalls 33.

Pawl control levers 38 extend from the front portion of the sidewalls 33 for controlling rotation of the rotatable ratchet mechanism. A female drive such as a box hex drive may be substituted for the drive shaft 37 as desired. Any male or female drive configuration may be fitted as desired such as square, hex, and spline configurations.

Figure 6A:
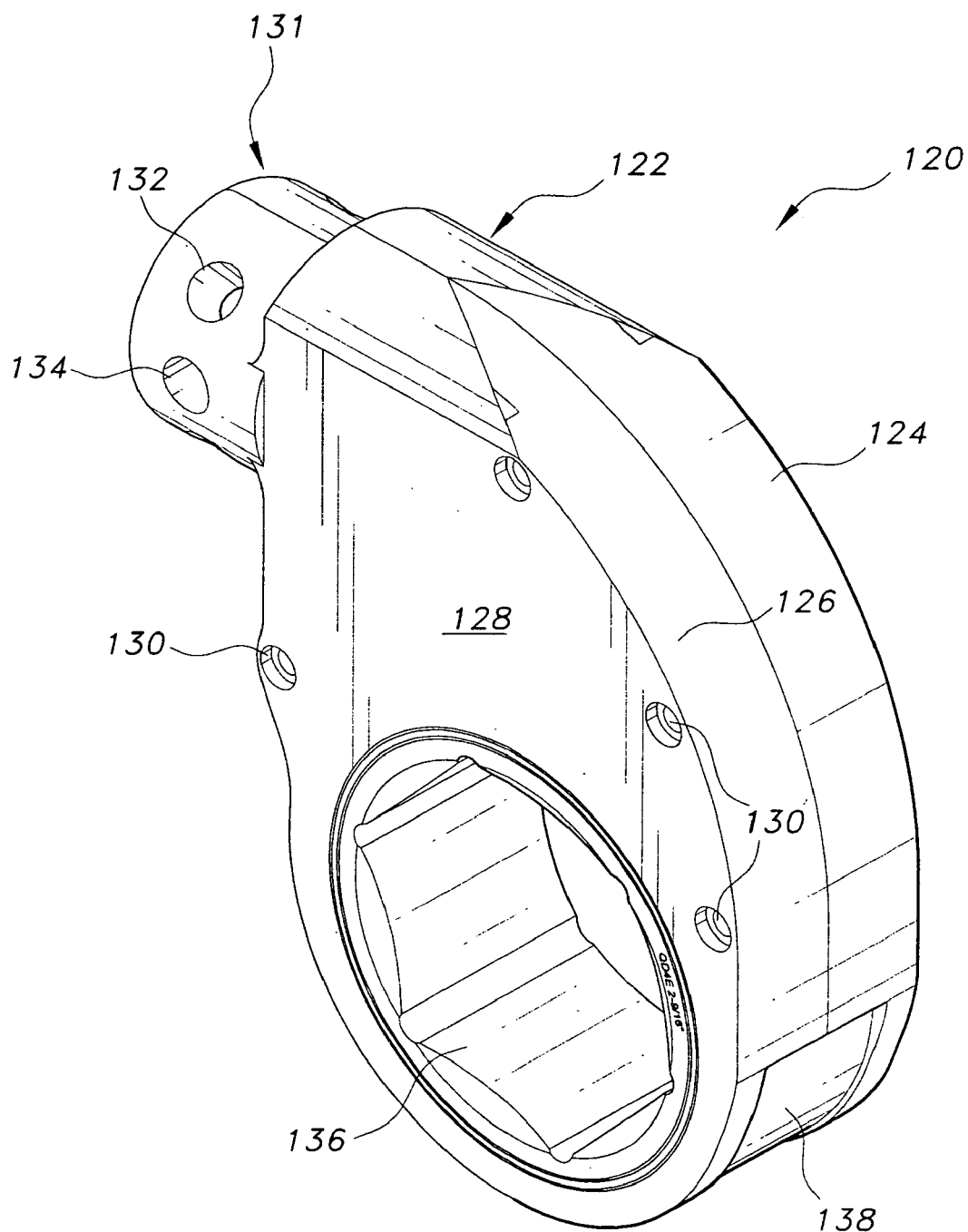
FIG. 6A is a rear perspective view of another embodiment of the torque wrench assembly having a split case.
Figure 6B:
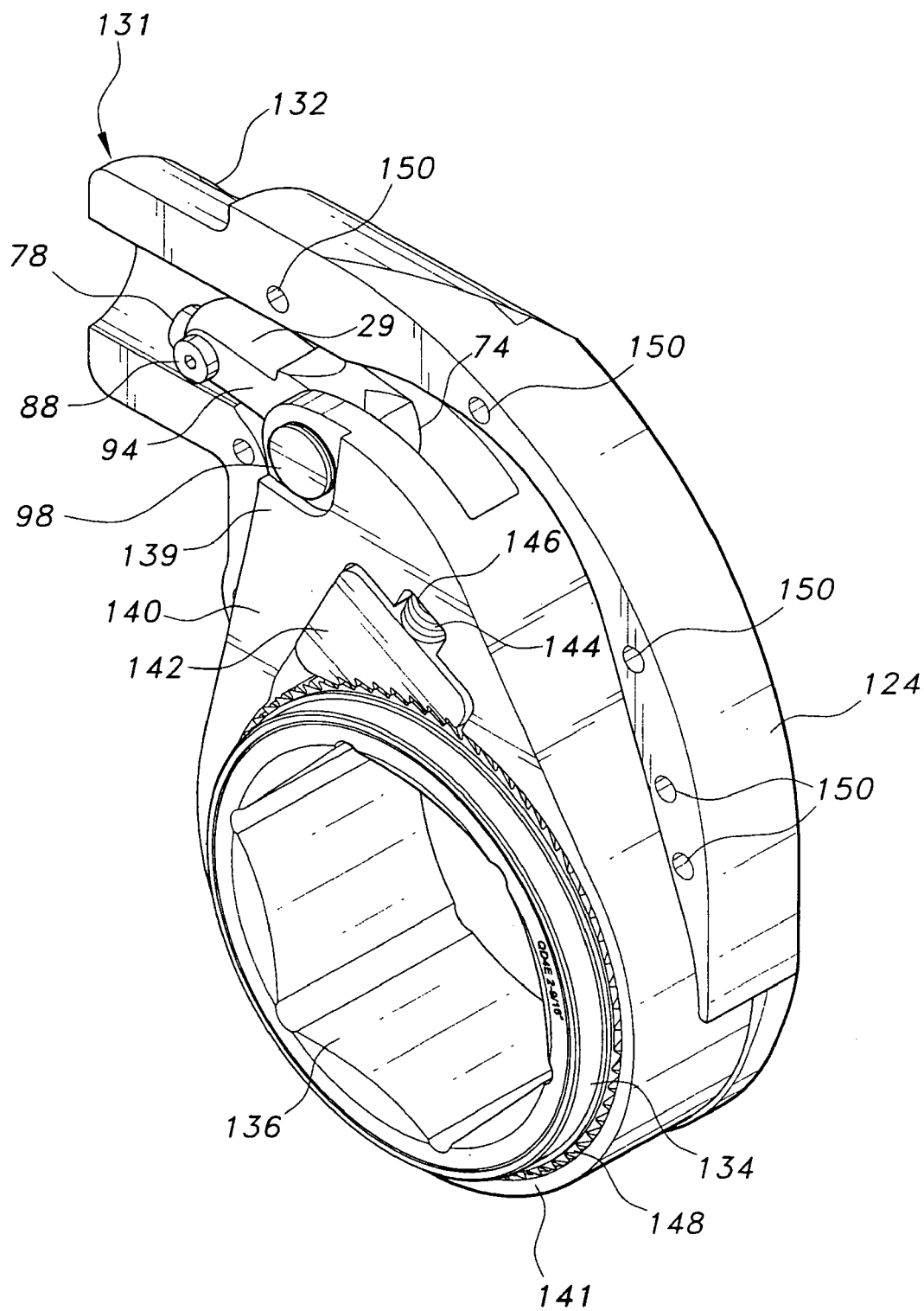
FIG. 6B is a broken away perspective view similar to FIG. 6A with half of the split case removed, revealing a ratchet mechanism and connecting rod of similar to that of FIG. 5.

Referring more particularly to FIGS. 6A and 6B, there is shown a front perspective view and a broken away front perspective view, respectively, of another embodiment 120 of the ratchet unit 14 of FIG. 1. Split case housing 122 is similar in overall shape to integral case housing 30 of the first embodiment described above and contains a similar ratchet mechanism with the exception that a single drive plate 140 is employed. Split case housing 122 is split along the vertical centerline as viewed at a vertical orientation along the front periphery of split case housing 122 and includes right cover housing 124 and a mating left cover housing 126. Right cover housing 124 and left cover housing 126 together form the peripheral wall of the split case housing as well as forming the left and right side walls. Right cover housing 124 and left cover housing 126 are essentially mirror images except for respective fastening structure described below. Left cover housing 126 has a cover face wall 128 having peripherally located and spaced bores for receiving fasteners 130 such as screws for connecting and securing the split housing 122 over the ratchet mechanism to encase the ratchet mechanism therein for operation of the unit. Ratchet unit 120 has a male connector cylindrical boss 131 extending rearwardly from the upper portion of the periphery of the split casing 122 in a manner similar to that of integral casing 30 of ratchet unit 14 and is split lengthwise along with the remaining portion of casing 122.

Male connector cylindrical boss 131, when assembled, is sized and configured to axially fit within female connector cylindrical boss 18 of hydraulic drive unit 12 as described above and has circumferentially spaced, inwardly tapered attachment bores 134 for receiving threaded end tapered bolts 24 for connection therewith at one of a plurality of selected angles. Ratchet drive wheel 136 is shown as a female hex box drive but may be square, splined or any other desired shape and has end bearings 134 supported by corresponding bearing supports in the lower portion of corresponding casing face walls such as cover wall 128. Annular bearings (not shown) similar to bearings 111 of the first embodiment may be placed between the end bearings 134 and the casing wall bearing support aperture when the unit is assembled. A single drive plate 140 has an upper drive plate lever end portion 139 and a drive plate lower ratchet end portion 141. Upper drive plate portion 139 defines a slot centrally spaced between the upper drive plate walls of such size and dimensions as to receive crank end 74 of crank rod 29, drive plate portion 139 having a perpendicular crank bore therethrough for receiving crank pin 98 upon which crank end 74 is mounted for rotation as crank rod moves reciprocally within male cylindrical boss 31.

The embodiment of FIGS. 3D–3F of crank rod 29 is employed in this embodiment, the sides thereof being lengthwise flats 94 so as to fit in the groove of drive plate upper lever portion 139 and the actuating spherical end 78 being rotatably attached to piston rod connectors (not shown) by hub screw 88 in threaded hub screw bore 90. A single driving pawl 142 is mounted in drive plate 140 in a manner identical to that of the first embodiment as illustrated in FIG. 4D and FIG. 5, similarly urged against ratchet wheel 148 by spring 144 held in drive pawl spring indent 146 such that when crank rod 29 urges the upper lever portion of drive plate 140 forward, the teeth of drive pawl 142 engage the ratchet wheel teeth, rotating ratchet wheel 148 to turn in a forward direction, the spring mounted drive pawl 142 ratcheting back over the ratchet wheel teeth when the crank rod 29 and thereby the upper lever portion of drive plate 140 is return to its rear retracted position. A ratchet wheel having a drive shaft as in the embodiment of FIGS. 4A–5 may be substituted for the female box drive of the split case embodiment as desired. During assembly, the ratchet mechanism and attached drive rod are placed in the right housing portion with the ratchet drive wheel bearing 134 set in the receiving aperture and the left housing portion placed thereover so as to align the spaced bores of the left split housing portion against fastener receivers 150 such as threaded bores and fasteners 130 inserted such as by turning to mate the split housing portions and form the complete ratchet unit ready for attachment with the hydraulic drive unit 12.

Referring to FIGS. 7A–7D there is shown a perspective view, a front elevation view partially exploded, an exploded detail view, a plan view, and an environmental front elevation view, respectively, of a flange spreader tool attachment for use with the hydraulic piston drive unit 12 of FIG. 1 and is useful for spreading conventional pipe flanges previously bolted together, but remaining adhered to each other after removal of the fasteners from the surrounding fastening bores. Flange spreader tool attachment 160 includes a horizontally disposed, elongated spreader plate 162 having a central, lengthwise axis and an upper surface, a lower surface, a peripheral edge surface and having a threaded rod 164 depending from each opposing end portion of elongated spreader plate 162 along and perpendicular to the central axis and suspended by corresponding tightening nuts 166 bearing on the upper surface of spreader plate 162.

Cylindrical pin rings 168 are attached as by welding to respective lower ends of the threaded rods 164, the pin rings 168 each having an outer peripheral surface 169 to which the corresponding threaded rod is diametrically attached such that the pin rings depend from and extend downwardly to collectively receive a horizontally disposed pin 170. Individual pin rings 168 are adjusted in height to horizontally receive pin 170 by adjusting the threaded rods 164 by rotating tightening nuts 166. Pin 170 is of such diameter as to fit in an open pipe flange bore B in aligned pipe flanges F. Clevis pin holes 172 are spaced along one end portion of pin 170 to receive a clevis pin 173 at a selected point along the pin to fit near one pin ring, and lift ring 174 is mounted near the opposite end of pin 170 such that the pin ring and inserted clevis pin 173 bridge the pin rings 168 when they are in place, suspending pin 170 so as to avoid pin 170 from sliding free of pin rings 168. The lift ring 174 and clevis pin 173 also allow the pin 170 along with the spreader attachment 160 to be employed at an incline or vertically during use.

Male cylindrical connector body 176 is centrally mounted perpendicular to spreader plate 162 and extending vertically upward therefrom and is of such size and configuration as to fit within the female connector boss 18 of the hydraulic drive unit 12 of FIG. 1. Body 176 has tapered attachment bores 177 circumferentially spaced therearound to receive threaded end tapered bolts 24 for attachment to female connector boss 18 at a selected angle in a manner similar to the attachment of ratchet unit 14(see FIG. 1). Wedge 178 has as convex separating edge 180 in line with a drive rod 182 extending from the upper rear wall of the wedge 178 at the wedge rod lower end to be axially received in male cylindrical body 176. Spreader plate 162 has a relative wide center portion 185 having centrally disposed vertical receiving bore 186 for receiving male cylindrical body 176. Spreader plate 162 tapers inwardly toward the central axis as it extends outwardly along the central axis to form relatively narrow, rounded portions 187, the spreader plate 162 maintaining a constant thickness throughout the length thereof.

Figure 7A:
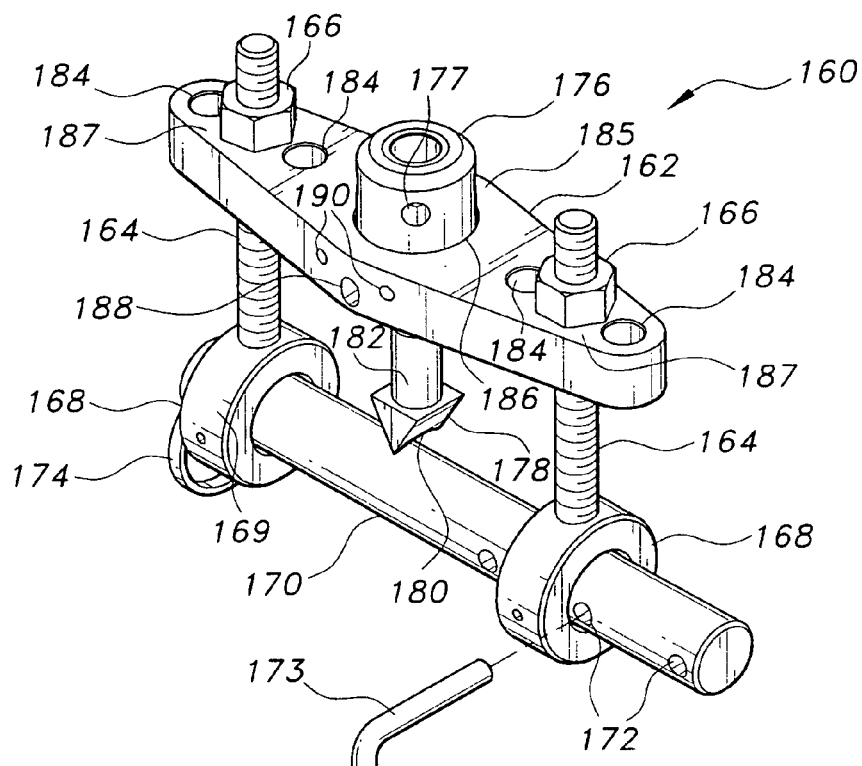
FIG. 7A is a perspective view of a flange spreader attachment useful with the hydraulic cylinder of FIG. 1.
Figure 7B:
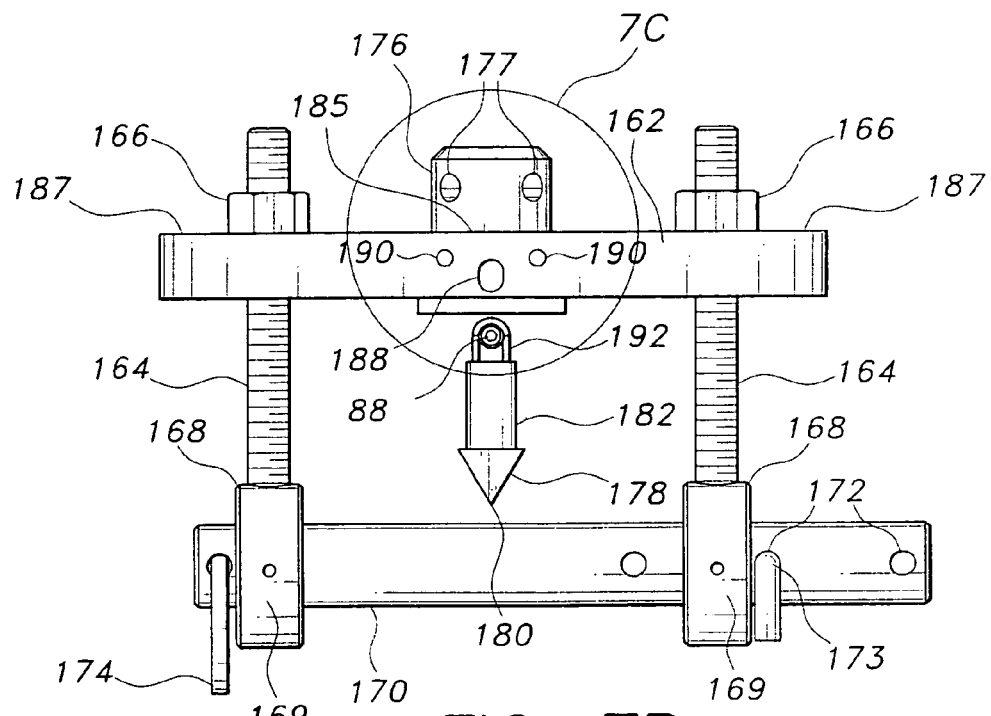
FIG. 7B is a side elevation view of the flange spreader attachment of FIG. 7A with the wedge unit broken away.
Figure 7C:
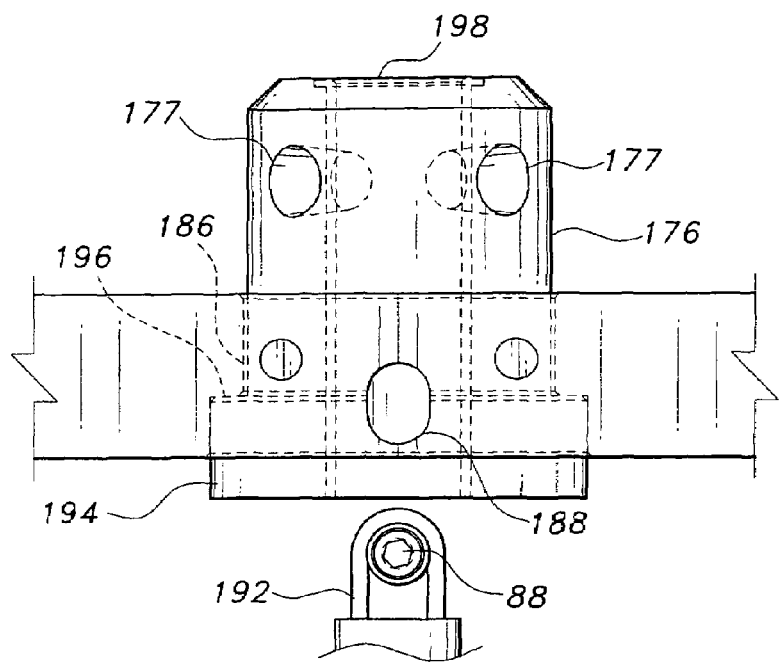
FIG. 7C is a detail view of FIG. 7B.
Figure 7D:
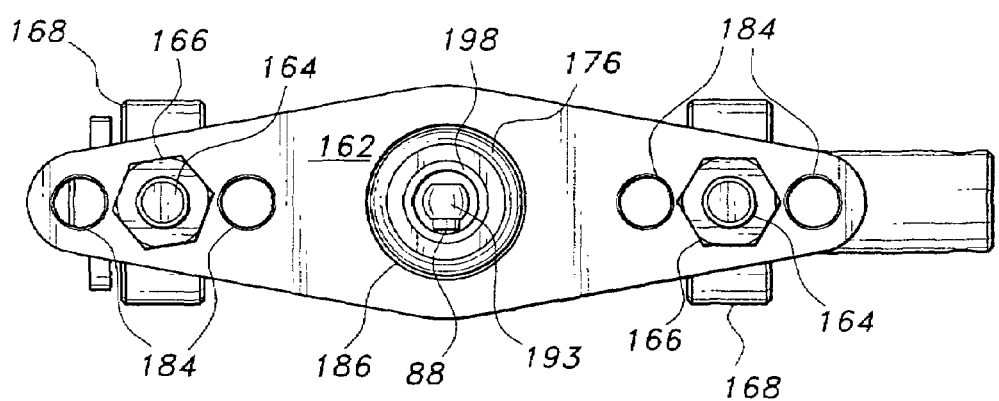
FIG. 7D is a plan view of the flange spreader attachment of FIG. 7A.
Figure 7E:
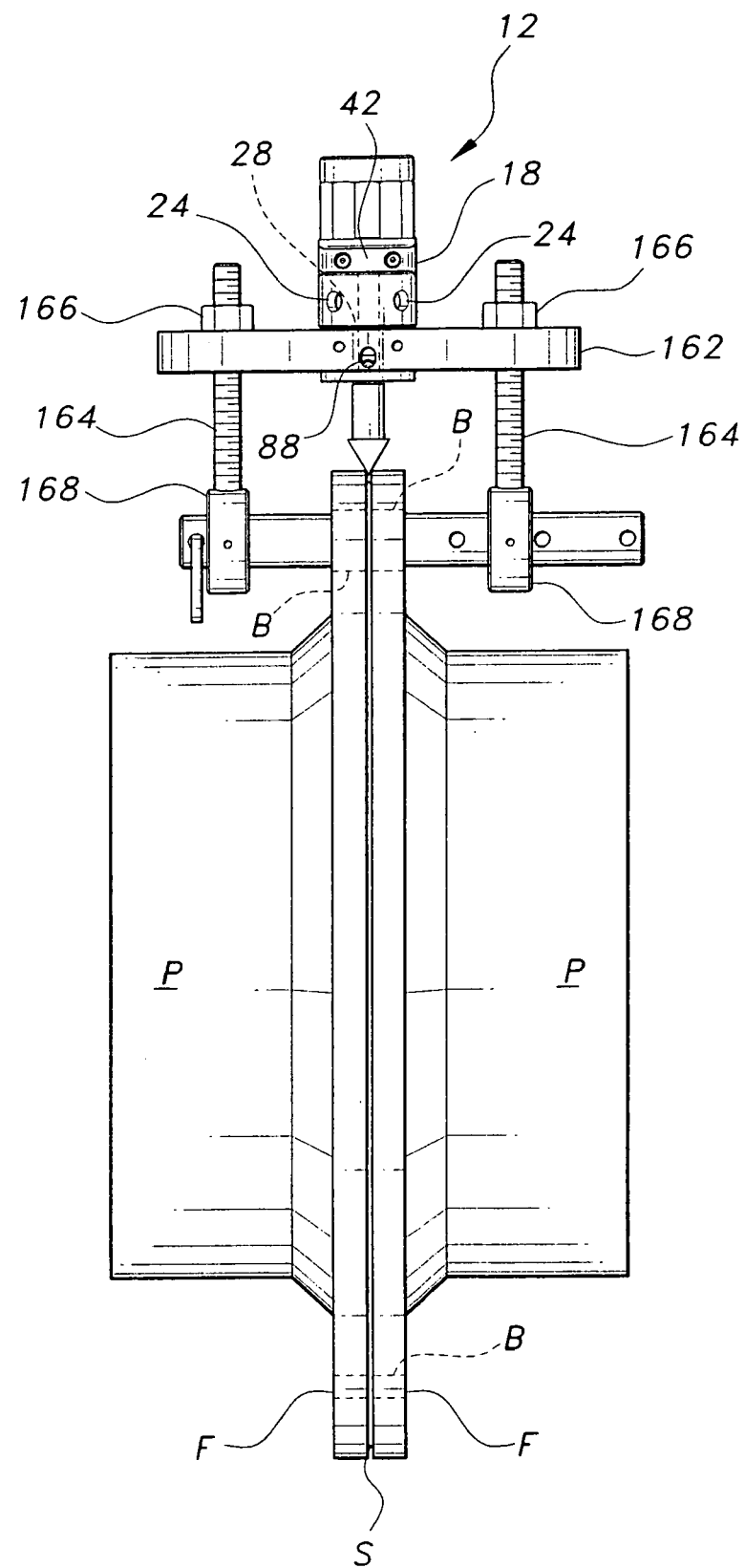
FIG. 7E is an environmental elevation view of the flange spreader attachment of FIG. 7A shown initiating separation of pipe flanges.

Three spreader plate mounting through-bores 184 are located in-line along the central axis at each end portion of spreader plate 162 and are of such diameter as to slidingly receive threaded rods 164. A through-bore at each end portion 187 is selected to receive a corresponding threaded rod 164 depending upon the width of the combined flanges to be bridged by the flange spreader assembly 160. The rounded ends of the narrow end portions serve as a washer surface for the tightening nuts 166 for the extreme end threaded rod locations. Spreader plate 162 has a hub screw oval access slot 188 extending from the front of the central portion 185 along its crosswise axis to provide access for attachment of a hub screw 88 through the split connector 26 of piston rod 28 of hydraulic piston driver unit 12(see FIGS. 3D–3F). The upper end of vertically disposed wedge drive rod 182 has a piston an "inverted U"-shaped wedge driven piston connector 192 extending upward from an upper end thereof for receiving the hub screw 88 when connected to the piston rod actuating end by means of split piston rod connector 26 and hub screw receiving bores 86. As shown in FIG. 7D, the upper end 193 of piston connector 192 may have a spherical shape so as to simulate the spherical end 78 of crank 29(see FIG. 3D) so as to bear against the piston rod radius bore 82 upon actuation. Also at least two parallel dowel pins 190 are provided and inserted through the wall of the central portion 185 of the spreader plate and corresponding bores in the wall of the male cylindrical body 176 to secure the male cylindrical body within the spreader plate body bore 186.

Cylindrical body 176 has a lower collar portion 194 and spreader plate 162 has a lower collar jamb 196 countersunk into the lower surface thereof to receive the lower collar portion 194 so as to centrally secure body 176 within bore spreader plate 162 and avoid outward axially dislocation of the cylindrical body during use. Cylindrical body 176 has a bronze bushing 198 extending therethrough along its inner wall to act as a piston rod guide and a wedge rod guide, the bushing being of such size diameter as to allow reciprocating movement of the attached guides while maintaining their axial movement during use of the spreader. In operation the pin is removed from the rings, the flange splitter is aligned such that the edge of the wedge is located at the connected surfaces of two flanges to be separated, the rod is placed through the depending rings and tightened against the outer peripheral surfaces of the connected flanges by turning the tightening nuts, pulling the flange spreader plate and thereby the wedge against the seal S at the flange connection, and applying hydraulic pressure against the wedge through the connection of the piston rod and the wedge rod, thereby separating the flanges F of pipes P.

Referring to FIGS. 8A–8E, there is shown a nut splitter attachment for use with the hydraulic piston drive unit 12 (see FIG. 1). Nut splitter attachment 200 has an elongated housing 201 having a nut receiving head portion 202, a cutter head recess portion 203, a neck portion 206, and a male cylindrical drive connector portion 204 and will be described herein as horizontally disposed, although the inventive nut splitter may be employed in any orientation. Nut splitter nut receiving head portion 202, cutter head recess portion 203, and neck portion 206 form upper and lower horizontal faces 207, male cylindrical drive connector portion 204 defining a housing central axis extending through neck portion 206 and cutter head recess portion 203. The distance between faces 207 is preferably about even with the thickness of the nut N to be split. Cylindrical male connector portion 204 has a plurality of circumferentially located tapered attachment bores 210 for axial attachment of the nut splitter 200 at a desired selected angle with the female connector boss 18 by means of threaded end tapered bolts 24 of hydraulic cylinder drive unit 12(see FIG. 1) in a manner similar to that described in the attachment of flange spreader attachment 160 described above.

Nut receiver portion 202 defines a generally cylindrical nut receiving opening 212 extending perpendicularly between upper an lower faces 207 and having a nut bearing forward flat 244 at its forward end perpendicular to the central axis of housing 201. Similar side flats are disposed on opposing sides of opening 212 and spaced to conform with opposing corners of a hex nut N for centering purposes when nut N is of the design size of nut splitter 200. The corners of the nut receiving opening 212 including those between forward flat 244 and the side flats are preferably rounded.

Cutter head recess portion 203 defines a rectangular cutter head recess 214 extending forward from neck portion 206 between upper and lower faces 207 and opening forward into nut receiving opening 212 and serves as a recess for the cutter head 218 and wedge rod forward end portion 232 as discussed below.

Figure 8A:
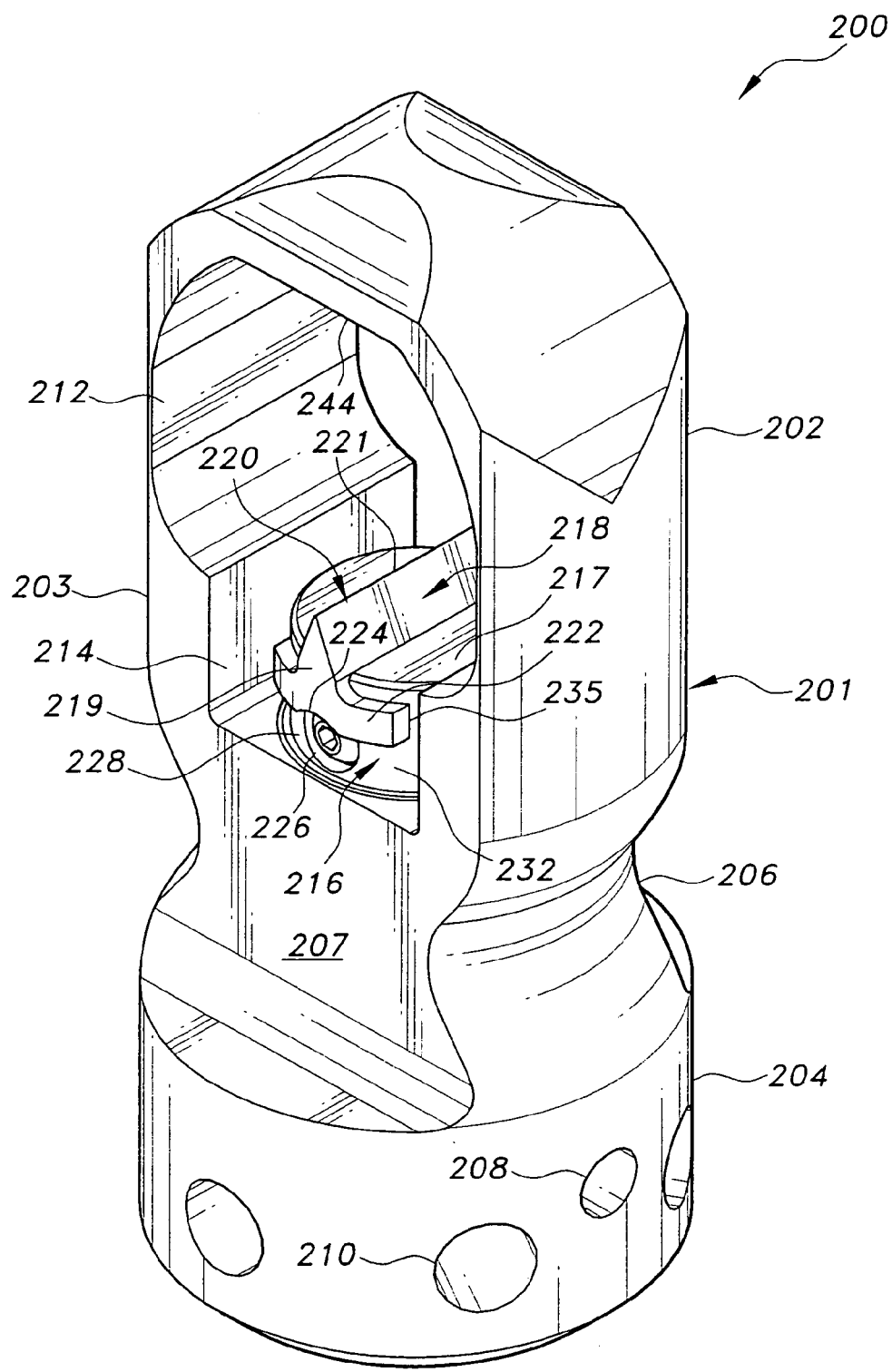
FIG. 8A is a perspective view of a nut splitter attachment useful with the hydraulic cylinder of FIG. 1.
Figure 8B:
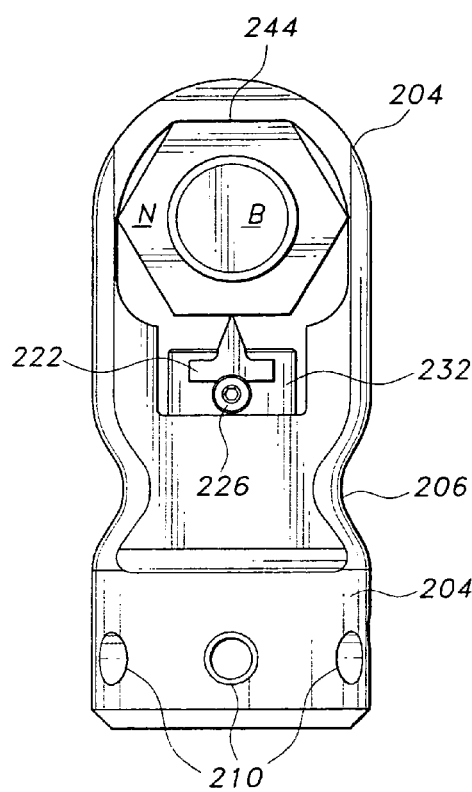
FIG. 8B is an environmental plan view of the nut splitter attachment of FIG. 8A.
Figure 8C:
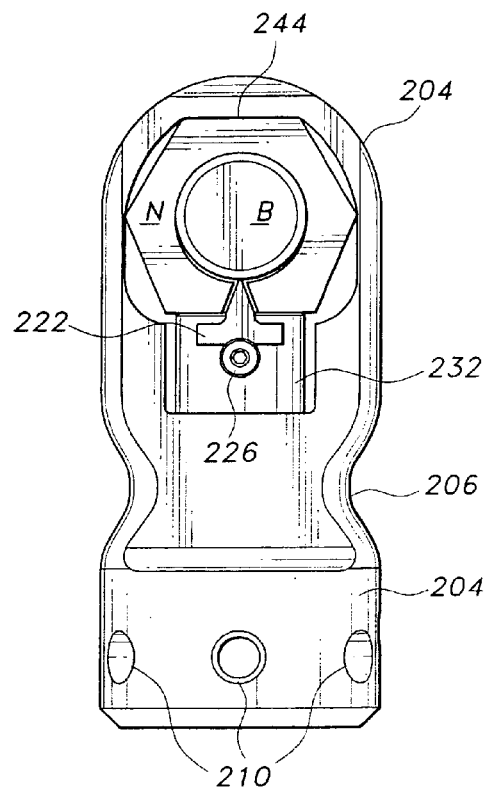
FIG. 8C is an environmental plan view as in FIG. 8B with the nut split.
Figures 8D, 8E:
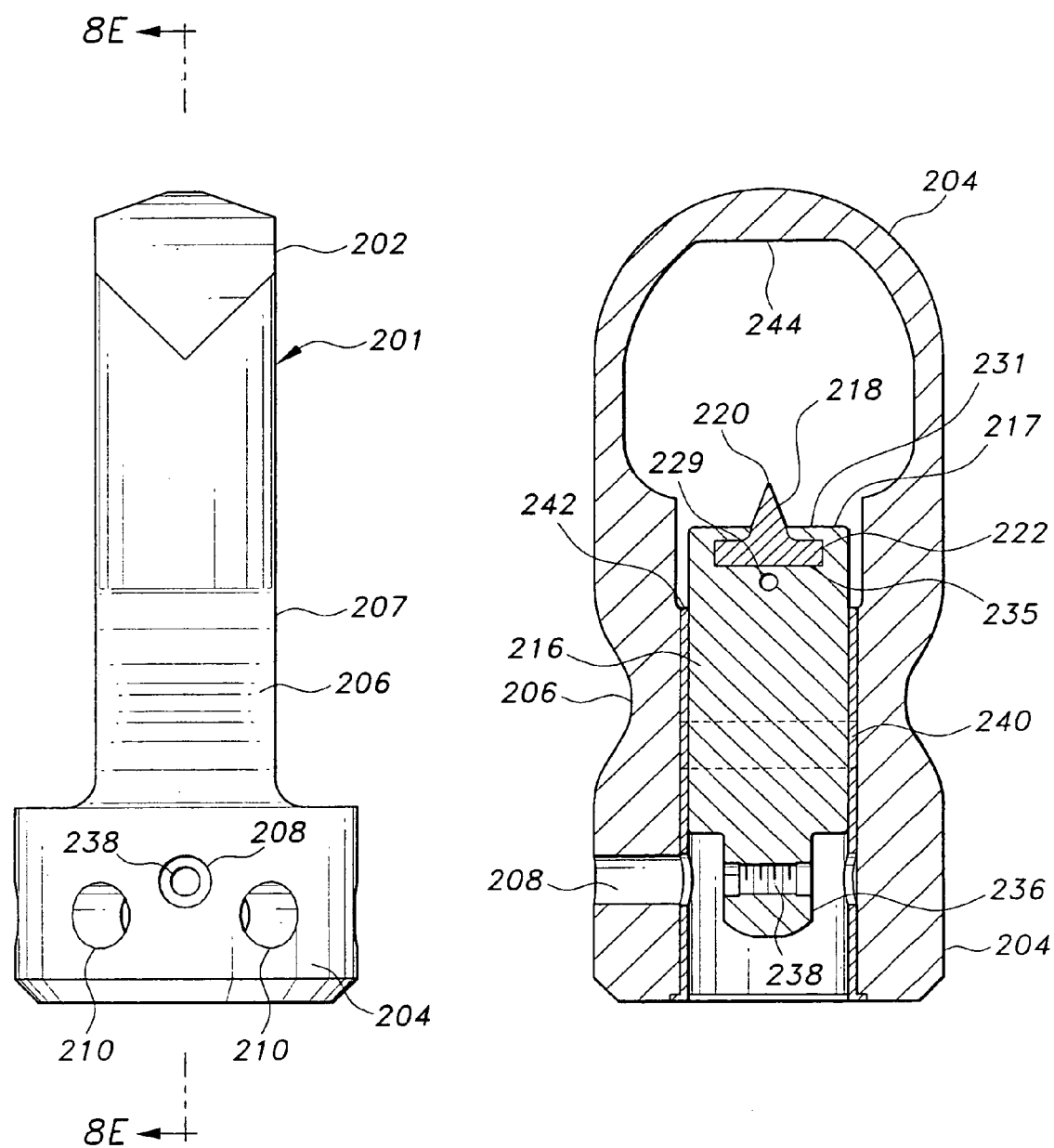
FIG. 8D is a side view of the nut splitter attachment of FIG. 8A.
FIG. 8E is a section view along the lines 8E—8E of FIG. 8D.
Figure 9A:
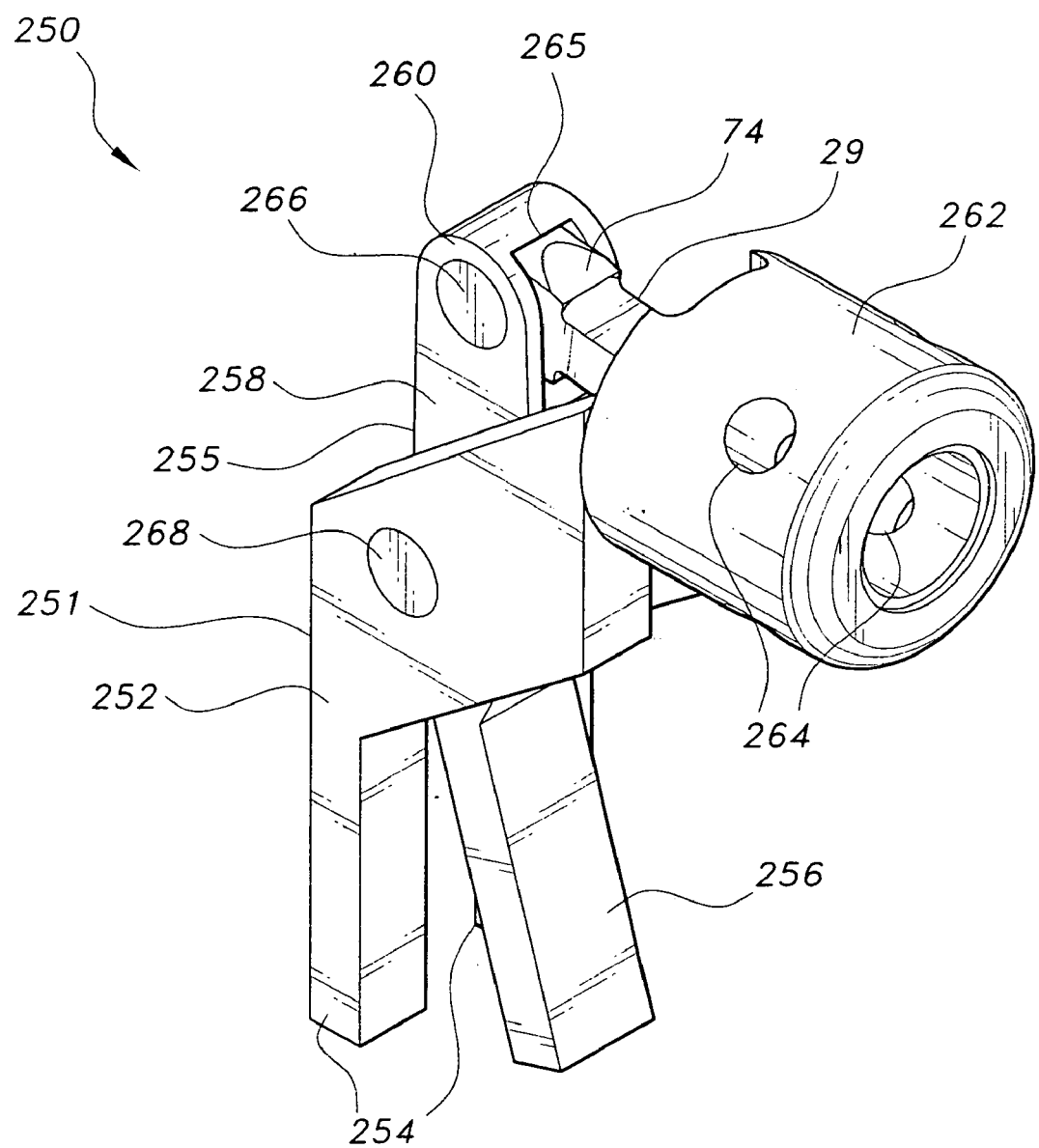
FIG. 9A is a front perspective view of a scissor-action shears attachment useful with the hydraulic cylinder of FIG. 1.

As seen in FIGS. 8E and 8F, a cylindrical wedge rod 216 extends through an axial bore 240 through cylindrical male connector portion 204 and neck portion 206 and extends into cutter head recess 214. The axial bore 240 has cylindrical bushing 242, preferably made of brass, extending along the wall of the axial bore in connector portion 204 and neck 206 and forming a sliding fit with wedge rod 216 to allow forward and rearward movement. Cylindrical wedge rod 216 has a forward end portion 232 having a vertically disposed, generally "T"-shaped slot 235 forming an opening along the vertical diameter of wedge rod forward end 217 and receiving a replaceable cutter 218. Replaceable cutter 218 has a rectangular base 222 centrally supporting cutter head 220 along its length and having a cross section of an isosceles triangle with the apex thereof extending through slot 235 forward of wedge rod endwall 217 to form a cutter head edge 222 extending vertically between faces 207. Cutter 218 has curved end faces 219 at the upper and lower ends thereof, extending beyond the cylindrical sidewall of wedge rod 216, acting as a stop to prevent removal of wedge rod 216 from housing 201 when cutter 218 is installed. The cutter 218 and the inner edges 231 of endwall 217 are preferably radiused as shown in the Figures.

As best seen in FIG. 2F, rectangular base 222 has a flat rear surface 223 having arched recess 224 extending inward from end faces 219 to respective cap screw head jambs 225. Also, wedge rod end portion 232 has a vertically oriented cap screw throughbore 229 along its vertical diameter and spaced rearward from said cutter base slot 235 and having a concentric cap screw countersink 228 at each end thereof. Cap screw throughbore 229 has tapped threads extending inward from each end thereof for receiving respective cap screws 226. Cap screw throughbore 229 has a cap screw countersink 228 at each end thereof for receiving the heads of respective cap screws 226, cap screw coutersinks 228 each having an upper opening 230 corresponding with arched recesses 224 of cutter rectangular base 222 so as to receive the heads of respective cap screws 226 when replaceable cutter 218 is properly placed in slot 235 such that cutter cap screw head jambs 225 are even with the jambs of cap screw coutersinks 228 in wedge rod 216. The cutter 218 is secured in place by screwing cap screws 228 into respective ends of threaded throughbore 229 until the head is against jambs 225 and the respective jambs of countersinks 228. The cutter 218 may be changed by removing cap screws 226, sliding out and removing the damaged cutter, replacing the cutter and securing cap screws 226.

As seen in FIG. 8E, wedge rod 216 has a side truncated spherical end connector 236 extending axially rearward from back end 234 for actuated connection with the spherical bore of the piston rod 28 by connector 26(see FIG. 3D). End connector 236 has a vertically extending hub screw receiver for receiving a cap screw (not shown) through access bore 208 for connection with piston rod 28.

In operation, as illustrated in FIGS. 8B and 8C, wedge rod 216 is placed in a retracted position such that the cutter 218 and wedge rod font end portion 232 are withdrawn into cutter head recess 214, the receiving head 202 placed over the seized nut N on bolt B and centered between the side flats of opening 212 and the cutter head splitting edge 221 placed against the center of one side of the nut N, the opposite side of nut N being held against flat 244. This allows the most splitting force as applied by wedge rod 216 to be applied at the weakest part of the nut N. The wedge rod is moved forward by activating the hydraulic driving unit, driving the piston rod end against the wedge rod end connector. Hydraulic pressure is applied to piston 25 (see FIG. 2C and FIGS. 3D–3F) driving the piston rod actuating end against wedge rod end connector 236, forcing cutter head 218 forward, causing splitter edge 221 against nut N. This allows the most splitting force as applied by wedge rod 216 to be applied at the weakest part of the nut N. As seen in FIG. 8C, further pressure causes the nut wall to split, the cutter head advancing to the fastener. The advance of the cutter head is stopped by contact of wedge rod end 217, thus avoiding damage to the fastener threads. The seized nut may now be easily removed from the fastener. The nut splitter 200 may be of any appropriate size according to the application, and the nut splitter may be oriented at an incline or vertically as well as horizontally as described above.

Referring to FIGS. 9A–9D, there is shown a front perspective view, a side elevation view, a front elevation view, and a section view, respectively, of a scissor action shears attachment for use with the hydraulic drive unit of FIG. 1. Hydraulic shears attachment 250 has a spaced pair of stationary shears plate elements 251 of identical dimensions having shears body plates 252 of generally parallelepiped shape, each having vertical front and rear peripheral edges and downwardly sloping upper and lower edges from rear to front. An aligned body pin bore extends perpendicularly through shears body plates 252 in the upper front portion thereof, and each body plate has a stationary jaw 254 extending downward from the lower front end, jaws 254 being of equal length. Hydraulic shears attachment 250 has a rotatable element 255 having an elongated, generally vertically disposed, movable jaw 256 extending downwardly at a forward angle from an elongated, generally vertically disposed rectangular movable jaw actuator portion 258 located in the space between stationary shears plate elements 251.

Jaw actuator portion 258 has a generally centrally located horizontal body pin bore aligned with the corresponding body pin bore of spaced plate elements 251 for mutual receipt of shears jaw rotation pin 268 for rotation of rotatable element 255 relative to spaced plate elements 251. Jaw actuator portion 258 has an upper portion 259 having a parallel slot spaced between the sides thereof and having a perpendicular rod crank pin bore extending through the upper end thereof. Male cylindrical connector boss 262 is substantially identical in configuration to that of the male cylindrical connector boss 31 of the ratchet unit 14 and is connected with female cylindrical connector boss 18 by means of threaded tapered bolts 24 at a desired angle (see FIG. 1). The forward end of cylindrical connector boss 18 is attached at the respective rear surfaces to stationary shears body plates 252 such as by welding, acting as a support between the spaced pair of body plates 252. A connecting rod 29 having flat sides 92 and a hub screw bore (see FIGS. 3D–3F) at spherical end 78 for attachment to piston rod connector 26 is employed for operation of hydraulic shears attachment 250 actuated by hydraulic drive unit 12.

Connecting rod crank end 74 is attached within parallel slot 265 to crank pin 266 for rotation therein. Spacer bearings 270 may be placed between the moving connecting rod 29 and shears body plates 252 to smooth relative motion. In operation, upon activation of the hydraulic driver unit, the actuating end of the piston rod pulls the connecting rod backwards, thereby forcing the crank end back against the crank pin which, in turn, forces the upper end portion of the rotatable element back and thereby rotating the rotatable element around the shears jaw rotation pin, thereby forcing the movable shear jaw between the spaced stationary shears jaws, thus accomplishing a shearing action. The shears jaw may be opened by activation of the hydraulic driver piston and piston rod in the opposite direction.

Figure 10C:
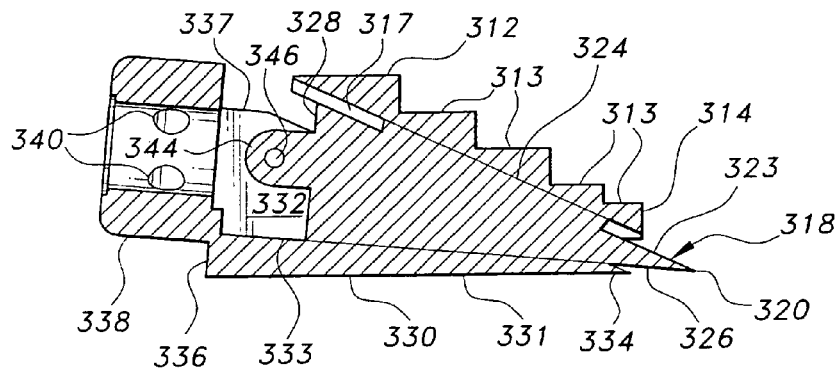
FIG. 10C is a section view taken along the line 10C—10C of FIG. 10B.
Figure 10B:
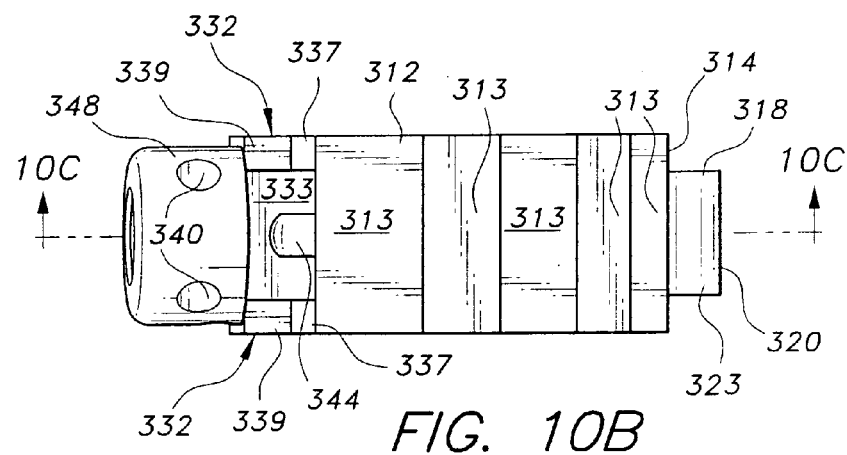
FIG. 10B is a plan view of the lift/spreader tool attachment of FIG. 10A.
Figure 10A:
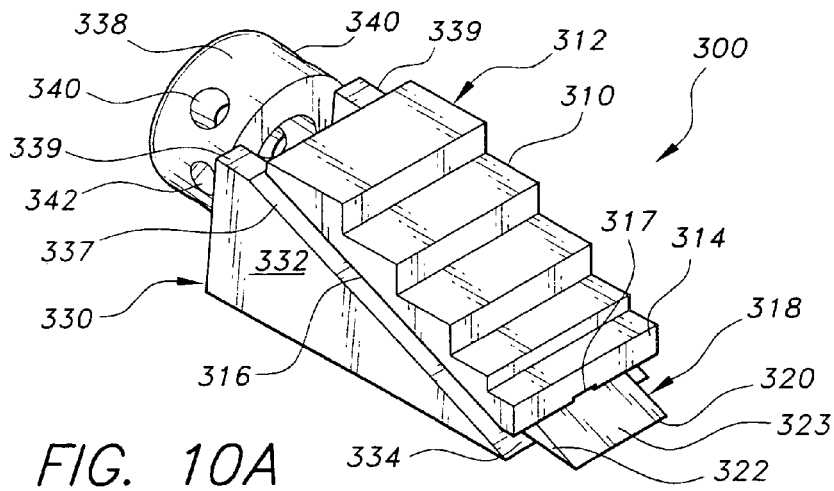
FIG. 10A is an upper perspective view of a lift/spreader tool attachment useful with the hydraulic cylinder of FIG. 1.

Referring to FIGS. 10A–10C, there is shown an upper perspective view, a plan view, and a section view, respectively, of a lift/spreader tool attachment useful with the hydraulic cylinder driver 12 of FIG. 1. Lift/spreader attachment 300 includes a movable step jaw 310 resting on and placed for relative motion with a driven wedge 318 which, in turn, is supported and guided for relative motion by lift body 330. A male connector is attached to or integral with lift body 330 and positioned at the rear thereof to accept the female connector 18 of the hydraulic drive unit 12 of FIG. 1 so as to drive the driven wedge 318 forward or back relative to lift body 330. The movable step jaw 310 has an upper rear portion 312 and a lower front portion 314 and has the configuration of stair steps cut at an angle such as to have horizontal treads 313 defined by vertical risers when movable step jaw 310 is assembled with movable jaw 312 and lift body 330. Preferably, the treads 313 increase in depth along moveable jaw 312 from its upper rear portion 312 to its lower front portion 314. As seen in FIG. 10B, moveable step jaw 310 is generally rectangular when viewed from above, preferably having a length greater than its width. When assembled, moveable jaw 312 has an inclined lower surface 316 having a centrally disposed, lengthwise alignment groove 317 for maintaining alignment with driven wedge 318 when moving relative thereto.

Driven wedge 318 has a front edge 320, vertical sides 322, and an upper surface 323 having a centrally disposed, lengthwise alignment tongue 324 of such size and configuration as to slidingly receive alignment groove 317 of movable step jaw 310. Driven wedge 318 has a lower planar surface 326 extending between a perpendicular rear wall 328 and front edge 320, perpendicular rear wall 328 extending to wedge upper surface 323 and between wedge sides 322. Driven wedge 318 has a piston connector boss 344 extending rearwardly and perpendicular to rear wall 328 and generally centrally disposed thereon and having a hub screw bore 346 for connection with the piston rod 28 of hydraulic drive unit 12 in a manner similar to the attachment of connecting rod 29 (see FIG. 1 and FIGS. 2D–2F).

Lift body 330 is generally wedge shaped, having a horizontal base plate 331, vertical sidewalls 332, a sloped inner basewall 333 having a sloped basewall front portion 334, a vertically disposed basewall rear portion 336, and a male connector boss portion 338 having circumferentially disposed tapered attachment bores for axial connection with female boss 18 of hydraulic drive unit 12 by means of threaded end tapered bolts 24(see FIG. 1). The sloped inner basewall 333 is comparable in dimensions to the wedge lower surface 326 so as to allow driven wedge 318 to slide thereon between lift body sidewalls 332 and be guided in a forward or reverse direction thereby. Male connector boss portion 338 is integral with the upper end of the basewall rear portion 336 and may also be connected or integral with the rear portion of sidewalls 332. Sidewalls 332 have parallel upper edges 337 sloping from the front upper end portion of attachment boss 340 forward to the forward intersection of the horizontal base 331. The rear portion 339 of upper edges 337 have a much lower degree of slope equal to the slope of the central axis of male connector 338. The lift body sloped inner basewall 333 has a bevel edge front portion 334 which coincides with the sloped sidewalls 337 at the forward end thereof.

Wedge piston connector boss 344 has a side truncated spherical actuated end shaped for contact with the inner spherical bore 82 within the actuating end of piston rod 28(see FIGS. 3D–3F). Male cylindrical connector boss portion 338 has a side located hub screw access bore 342 near its front end portion for inserting a hub screw 88 therethrough and securing wedge piston connector boss 344 within piston rod connector 26 by means of inserting hub screw 88 through a bore connector bore 86 and fastening within wedge piston connector hub screw receiver 346.

In operation, wedge front edge 320 is placed against the joint or the point the structure to be raised rests on its support. The hydraulic piston unit is actuated, pushing the wedge front edge so as to separate the joint or raise the structure. In the lift mode a structure to be lifted is placed on one of the treads of the moveable step tread and the hydraulic piston unit actuated, pushing the driven wedge forward and, as a result, the moveable step tread is lifted, along with the structure or item to be lifted. By utilizing a series of chocks (not shown) the structure may be separated from the surface support by the wedge front wedge and lifted thereby to the level of the front tread. The structure may then be chocked, the wedge pulled back, and the structure then lifted to the height of the second tread. By repeating this process, the structure or item may be incrementally lifted within the capacity of the particular spreader/lifter of the present invention according to its dimensions.

Figure 11A:
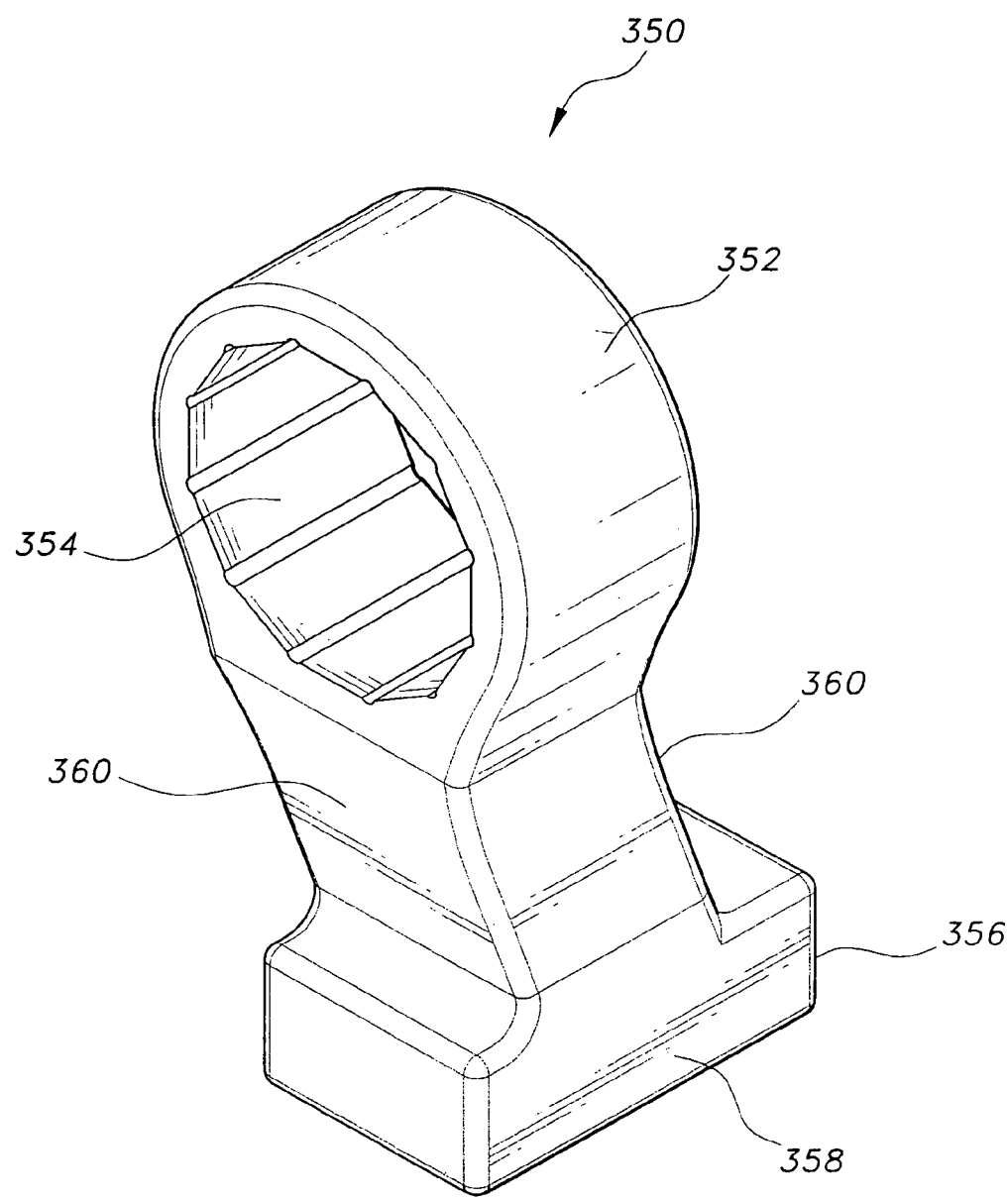
FIG. 11A is an upper perspective view of a reaction bar useful with the hydraulic cylinder coupled with the ratchet of FIG. 1.
Figure 11B:
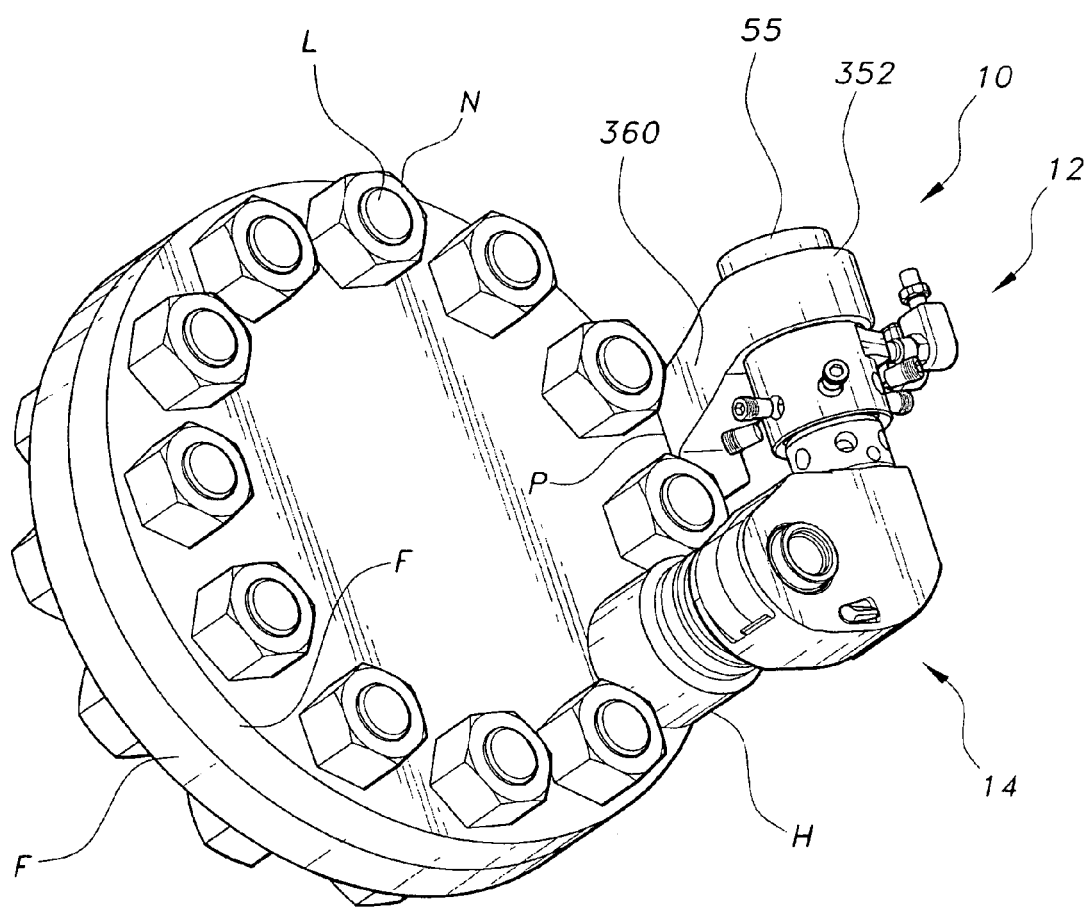
FIG. 11B is an environmental perspective view of the reaction bar of FIG. 11A as attached to the body of the hydraulic cylinder coupled with the ratchet of FIG. 1 shown tightening a nut while connecting a pair of flanges.

Referring to FIGS. 11A and 11B there is shown an upper perspective view and an environmental perspective view, respectively, of a reaction bar useful with the hydraulic cylinder coupled with the ratchet of FIG. 1(shown in exploded view). Reaction bar 350 is an elongated, integral element and includes an upper cylinder 352 having a female polygon inner cylinder wall 352, and a rectangular base portion 356 separated by an angled rectangular trunk portion 360. Upper cylinder 352 is of such width and female polygon inner cylinder wall 354 is of such diameter and having such a polygonal shape as to fit over the polygon cylinder unit wall 44 of cylinder unit body 16(see FIG. 2D) extending the length thereof and held in place by threaded end cap 50 as mounted in threaded end cap accessory receiver 54 in the free end 20 of hydraulic driver unit 12. The upper cylinder 352 has a horizontal central axis and is positioned rearwardly relatively to the rectangular base so as to be in line substantially vertically with the rear wall of rectangular base portion 358. The angled rectangular trunk portion slopes forwardly from the upper cylinder 352 to the rectangular base portion 356 leaving a notch-like upper surface on the rear end of the base extending outward from the lower end of the rectangular trunk portion 360. A similar ledge is located on the upper surface of the front portion of the base portion 356 between the front end of the base and the lower end of the rectangular trunk portion 360. The sides of angled rectangular portion 360 and those of rectangular base portion 356 are coextensive, forming a bearing surface 358.

As shown in FIG. 11B, hydraulic torque wrench 10 is attached to a nut N threaded on a lug L connecting flanges F for turning ratchet 14 having hex socket H. Upper cylindrical portion 352 of reaction bar 350 is vertically positioned on the body of hydraulic drive unit 12 and held place by retainer cap 50. The angled rectangular trunk portion 360 extends downward, supporting rectangular base portion 356, which, in turn, bears against pressure point P on the circumferential walls of flanges F at base bearing wall 358. As ratchet unit 14 is forced forward to turn hex socket H on nut N, base bearing wall 358 bears against pressure point P, thus preventing the ratchet and drive system 10 from rotating inwardly relative to the flanges F. This results in the nut H being turned by hex socket H to a desired torque.

Figure 12:
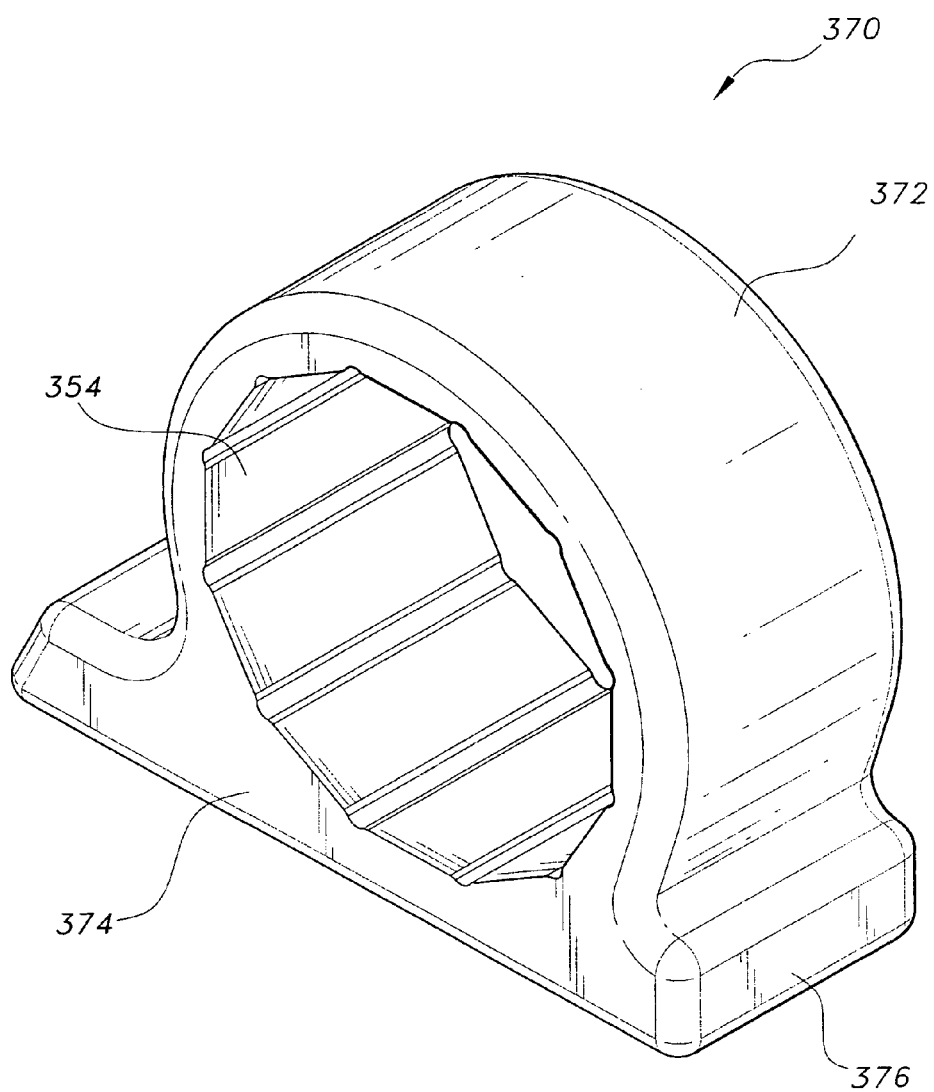
FIG. 12 is an upper perspective view of a reaction boot useful with the hydraulic cylinder coupled with the ratchet of FIG. 1.

Referring to FIG. 12, there is shown an upper perspective view of a reaction boot useful with the hydraulic cylinder coupled with the ratchet of FIG. 1. Integral reaction boot accessory 370 has an upper cylindrical portion 372 of such width and female polygon inner cylinder wall 354 of such diameter and having such a polygonal shape as to fit over the polygon cylinder unit wall 44 of cylinder unit body 16 (see FIG. 2D), extending the length thereof and held in place by threaded end cap 50 as mounted in threaded end cap accessory receiver 54 in the free end 20 of hydraulic driver unit 12. Upper cylindrical portion 372 is mounted on a rectangular base portion 374 having a width equal to that of upper cylindrical portion 372 and a length such as to extend beyond each end of cylindrical portion 372. Upper cylindrical portion 372 is preferably offset relative to the length of the rectangular base portion 374, defining a notch-like upper surface extending inward from an end bearing wall 376 of rectangular base portion 374. Reaction boot accessory 370 is mounted for use similarly to that of reaction bar accessory 350(see FIG. 11B and discussion above) so as to counteract the reaction of hydraulic torque ratchet system 10 with the exception that end bearing wall 376 bears against the wall of an adjacent nut N rather than the peripheral flange wall as in the case of reaction bar 350.

The inventive hydraulic torque ratchet system and attachments may be made of appropriate materials, such as tool steel, and elastomeric and metal seal and bushing materials.

It is to be understood that the present invention is not limited to the embodiments described above, but encompasses any and all embodiments within the scope of the following claims.

We claim:

1. A hydraulically operated flange spreader comprising:
   a hydraulic drive unit having a generally cylindrical body having a front wall and an end cap and defining a hydraulically operated piston driving a piston rod, said front wall having an axially located bushing for reciprocally supporting said piston rod, said piston rod having an actuating end opposed to said piston, said piston rod actuating end having opposing connectors extending from the periphery of said actuating end having a threaded bore for threadingly receiving a hub screw, said cylindrical body having a female cylindrical boss extending axially from the front wall of said cylindrical body; and
   a flange spreader for spreading flanges after removal of fasteners comprising:
   a wedge rod having an upper end and a lower end, said lower end having a wedge connected thereto, said wedge having a lower edge oriented for insertion between flanges;
   a horizontally disposed, elongated spreader plate having a lengthwise central axis and an upper surface, a lower surface, and a peripheral edge surface and having a wide central portion tapering to two relatively narrow opposed end portions, said spreader plate tapering from said central portion to said end portions, respectively, said spreader plate defining a large centrally located aperture for receiving a cylindrical male connector body, and a plurality of spaced vertical bores located along said central axis at each end portion of said spreader plate;
   a threaded rod extending vertically through one of said plurality of spaced vertical bores at each of said end portions of said spreader plate, each said threaded rod being diametrically attached as by welding to a respective pin ring having an outer circumferential peripheral surface thereof such that said pin rings extend downwardly;
   a horizontally disposed pin of such length and diameter as to be collectively received and supported by said pin rings;
   a tightening nut located on each said threaded rod above said spreader plate, and a horizontally disposed pin extending through said pin rings;
   a cylindrical male connector body extending vertically through said centrally located aperture and extending upward for axial insertion within said female cylindrical boss, said cylindrical male body having a collar extending from its base, said collar being at least partially countersunk into said spreader plate through its lower surface; and
   an inverted "U"-shaped piston connector mounted on the upper end of said wedge rod and having such size as to be received in said piston rod actuating end connectors and removably attached thereto by a hub screw;
   said female boss being removably mountable over said male connector body and having a plurality of radially directed, circumferentially spaced, threaded throughbores and said male cylindrical body having a plurality of outward opening, radially directed, circumferentially spaced bores corresponding in location to said bores of said female cylindrical boss; and
   said female boss and said male connector body having a plurality of connecting pins, each having an outer threaded portion and an inwardly tapered inner portion, each pin being threadably insertable through said through-bore of said female boss and into a said tapered male body bore such that said female boss and said male connector body may be connected at one of a plurality of selected radial angles;
   whereby said pin is removed from said rings, said flange splitter is aligned such that said edge of said wedge is located at the connected surfaces of two flanges having all fasteners removed, said threaded rod is extended on opposite sides of the connected flanges so as to align the depending rod rings with aligned fastener bores of said connected flanges, said threaded rod is placed through the depending rings and tightened against the outer peripheral surfaces of said connected flanges by means of said tightening nuts pulling said flange spreader plate and thereby said wedge against said flange connection, and applying hydraulic pressure against said wedge thereby separating said flanges.

2. A hydraulic nut splitter comprising:

a hydraulic drive unit having a generally cylindrical body having a front wall and an end cap and defining a hydraulically operated piston driving a piston rod, said front wall having an axially located bushing for reciprocally supporting said piston rod, said piston rod having an actuating end opposed to said piston, said piston rod actuating end having opposing connectors extending from the periphery of said actuating end having a threaded bore threadingly receiving a hub screw and surrounding a spherical bore, said cylindrical body having a female cylindrical boss extending axially from the front wall of said cylindrical body; and a nut splitter unit comprising:

an elongated housing having a nut receiving head portion, a cutter head recess portion, a neck portion and a male cylindrical drive connector portion, said head portion, said cutter head recess portion, and said neck portion having upper and lower horizontal faces, said male cylindrical drive connector portion defining a central axis extending through said neck portion;

said neck portion and said male cylindrical drive connector portion defining a bore extending axially therethrough;

a wedge rod slidingly mounted within said bore and having a forward end portion having a replaceable cutter secured therein, said cutter having a cutter head extending forward therefrom a distance about equal to the minimum thickness of a nut wall, said wedge rod having an axially located rear piston rod receiving boss extending from the rear thereof;

said nut receiving head portion defining a generally cylindrical nut receiving opening extending between said upper and lower faces and having a nut bearing forward flat opposite said wedge rod;

said cutter head recess portion defining a rectangular cutter head recess extending between said upper and lower faces and opening into a nut receiver opening, said cutter head recess having a width sufficient to provide clearance for said wedge rod to extend therethrough;

said cutter head being triangular in cross section forming a vertically oriented forward splitting edge extending toward said nut bearing forward flat;

said rear piston rod receiving boss having a spherical connector configured for actuated connection with said piston rod actuating end opposing connectors by means of a hub screw and said spherical bore;

said male cylindrical portion having a plurality of outward opening, radially disposed, tapered, circumferentially spaced attachment bores said female cylindrical boss of said hydraulic drive unit having a plurality of radially directed, circumferentially spaced, threaded through-bores corresponding in location to said bores of said male cylindrical bores and removably mountable over said male cylindrical portion; and a plurality of connecting pins, each having an outer threaded portion and an inwardly tapered inner portion, each pin being threadably insertable through said through-bore of said female boss and into a said tapered male body bore such that said female boss and said male portion may be connected at one of a plurality of selected radial angles;

whereby said nut receiving head portion is placed over a seized nut of a fastener such that said cutter splitting edge bisects a flat of said nut, the opposite flat of the nut being located against said nut bearing forward flat; and whereby said hydraulic unit is actuated, driving said piston rod against said wedge rod, forcing said cutter splitting edge against seized nut and thereby splitting said seized nut for removal from the fastener, the wedge rod forward end acting as a stop against the split nut wall, thereby avoiding damage to the threads of the fastener.

* * * * *